United States Patent
Okagami et al.

[11] Patent Number: 5,989,412
[45] Date of Patent: Nov. 23, 1999

[54] HYDRODEMETALLIZING CATALYST FOR HYDROCARBON OIL AND PROCESS OF HYDRODEMETALLIZING HYDROCARBON OIL THEREWITH

[75] Inventors: Akio Okagami, Yokohama; Akio Furuta, Chita-gun; Fujio Tsuchiya, Yokohama; Shinichiro Suhara, Handa, all of Japan

[73] Assignee: Catalysts & Chemicals Industries Co., Ltd., Japan

[21] Appl. No.: 08/981,152

[22] PCT Filed: Apr. 8, 1997

[86] PCT No.: PCT/JP97/01194

§ 371 Date: Dec. 5, 1997

§ 102(e) Date: Dec. 5, 1997

[87] PCT Pub. No.: WO97/37766

PCT Pub. Date: Oct. 16, 1997

[30] Foreign Application Priority Data

Apr. 8, 1996 [JP] Japan ......................................... 85444
Apr. 8, 1996 [JP] Japan ......................................... 85445

[51] Int. Cl.[6] .............................. B01J 23/00; B01J 23/40; C10G 17/00
[52] U.S. Cl. ..................... 208/251 H; 502/305; 502/313; 502/315; 502/327; 502/335; 502/527.12; 502/527.18; 502/527.15; 502/527.24
[58] Field of Search ............................ 208/251 H; 502/4, 502/439, 527.15, 527.16, 305, 313, 315, 325, 327, 332, 335, 337, 527.11, 527.12, 527.13, 527.18, 527.24

[56] References Cited

U.S. PATENT DOCUMENTS

| | | | |
|---|---|---|---|
| 4,378,308 | 3/1983 | Angevine et al. | 252/455 R |
| 4,510,263 | 4/1985 | Pereira et al. | 502/314 |
| 4,568,448 | 2/1986 | Angevine et al. | 208/213 |
| 4,861,746 | 8/1989 | Oishi et al. | 502/314 |
| 5,217,603 | 6/1993 | Inoue et al. | 208/251 H |
| 5,334,307 | 8/1994 | Simpson et al. | 208/254 H |

FOREIGN PATENT DOCUMENTS 354050494  4/1979  Japan .

*Primary Examiner*—Walter D. Griffin
*Assistant Examiner*—Tam M. Nguyen
*Attorney, Agent, or Firm*—Webb Ziesenheim Logsdon Orkin & Hanson, P.C.

[57] ABSTRACT

A hydrodemetallizing catalyst for a hydrocarbon oil comprising a support and a catalytic component carried on the support, this catalyst having a surface, part of which has a coating layer composed of an inert substance having substantially no demetallizing activity, this coating layer allowing substantially no reaction fluid to permeate therethrough. This catalyst preferably has a reaction flow path through which a reaction fluid flows thereinside and is preferred to be, for example, in the form of a honeycomb structure or cylinder having one or a plurality of through holes.

In the hydrodemetallization of heavy oils using the above hydrodemetallizing catalyst for a hydrocarbon oil, the sticking of the catalyst can be prevented and the spacing between catalyst particles can be maintained to thereby prevent a rapid increase of differential pressure, so that a continuous operation can be performed for a prolonged period of time.

22 Claims, 16 Drawing Sheets

Change of Pressure Drop of Demetallization Catalyst Bed with Time on Stream

HYDRODEMETALLIZING CATALYST FOR HYDROCARBON OIL AND PROCESS OF HYDRODEMETALLIZING HYDROCARBON OIL THEREWITH

TECHNICAL FIELD

The present invention relates to a hydrodemetallizing (hydrogenating and demetallizing) catalyst for a hydrocarbon oil and also relates to a process of hydrodemetallizing a hydrocarbon oil with the use of this catalyst. More particularly, the present invention is concerned with a hydrodemetallizing catalyst for a hydrocarbon oil which enables performing a continuous operation for a prolonged period of time in the hydrogenation of hydrocarbon oils, especially, a heavy oil and is also concerned with a process of hydrodemetallizing a hydrocarbon oil with the use of this catalyst.

BACKGROUND ART

The high boiling point hydrocarbon oils such as tar sand oil and petroleum distillation residue obtained by the atmospheric distillation or vacuum distillation of crude oil contain a large amount of impurities such as metals, sulfur compounds and nitrogen compounds. Thus, the hydrogenation technique as the most common purification means is now applied to the high boiling point hydrocarbon oils for utilizing them as various types of fuels and raw materials for chemical industry.

The trend toward a rapid shift of the stock oil to heavier oils is encountered especially in recent years. Accordingly, the demand for the resolution of technical problems of demetallization is increasing in addition to the problems of the conventional desulfurzation, denitrification and conversion to a light oil.

A problem of process technology in the hydrogenation of heavy oils is not only how to attain a high level of desulfurization degree but also how to remove metals as impurities and how to reduce the effect of metal deposition onto catalyst on the catalytic performance.

As different from sulfur compounds and nitrogen compounds, organometallic compounds and other metal components contained in the stock oil generally involve a phenomenon such that, except for unreacted part, substantially all of them deposit in the form of, for example, metal sulfides on the catalyst in accordance with the advance of the reaction and are not discharged outside the reaction system through the period of operation. This results in inviting problems such that the catalytic performance is lowered and that clogging of the catalyst bed increases the pressure drop in the reaction vessel.

Further, in the process of hydrogenation for heavy oil, carbonaceous substances (hereinafter may be referred to as "carbon") are deposited by the hydrocarbon decomposition reaction which is regarded as an inevitable side reaction.

The above deposited substance is the major cause of the pressure drop increase (hereinafter may be referred to as "$\Delta P$ increase") experienced in the fixed bed reactor in which a particulate catalyst is packed.

In the process of heavy oil hydrogenation, generally, the type (for example, active metal species and amount of carried metals) of catalyst to be packed in the reactor and the amount of packed catalyst are determined on a condition that the catalyst would effectively function throughout the packed bed during the period of one cycle of continuous operation. However, in the actual operation, a rapid increase of $\Delta P$ occurs before the planned volume of oil passage with the result that an arrival at the state of being no longer capable of continuing the operation is experienced.

That is, as long as the catalyst is appropriate for the stock oil, the activity of latter stage desulfurization catalyst is lowered in accordance with the predetermined schedule before the $\Delta P$ increase of first direct desulfurization column (demetallizing reaction tower), and the operation is terminated. Unexpected deactivation of the desulfurization catalyst is caused by deterioration of the demetallizing catalyst at a latter period of the operation with the result that heavy metals contained in the stock oil acceleratingly deposit on the desulfurization catalyst. Moreover, at a latter period of the operation, the temperature of the catalyst bed is raised in accordance with the lowering of the activity of the demetallizing catalyst and desulfurization catalyst to thereby compensate for the lowering of the catalyst activity. However, this temperature increase causes conspicuous coking on the catalyst to thereby provide another cause of the deterioration of the desulfurization catalyst. Thus, since the catalyst deterioration and the catalyst bed clogging rapidly advance at a latter period of the operation, skilled operation management for the direct desulfurizer resides in terminating the scheduled operation just before the rapid advance of the catalyst deterioration and catalyst bed clogging. In this event, although a latter part of the demetallizing catalyst bed retains a demetallizing capability, the demetallizing catalyst bed as a whole has poor activity, so that discontinuation of the operation cannot be avoided. Reinforcing the amount of catalyst of the demetallizing catalyst bed may be contemplated as a countermeasure. In this case as well, the problem of clogging of the top part of catalyst bed at an inlet of the demetallizing catalyst cannot be solved, so that, after all, the operation period substantially cannot be prolonged because of the pressure drop increase although the demetallizing capability of the demetallizing catalyst bed as a whole is retained in large proportion due to the catalyst reinforcement.

The inventors studied the reaction mechanism of the catalyst layer based on the results of observation of catalyst having been used in an actual direct desulfurizer and the demetallizing reaction test in laboratory and recognized the occurrence of the following phenomenon on the catalyst.

Illustratively, in the initial period of the use of the demetallizing catalyst, demetallization is preferentially advanced in catalyst particles in which active metal species such as molybdenum are present and impurity metals such as vanadium and nickel contained in the heavy oil deposit and are retained in the catalyst particles.

When a large amount of vanadium and other impurity metals are accumulated in the catalyst particles with the passage of demetallization time, the active metals (hereinafter represented by molybdenum) within the catalyst particles gradually move to a surface layer of the catalyst particles to thereby form a concentrate layer and, further, a molybdenum layer is formed outside the catalyst particles. The molybdenum which is present in the outside layer of the catalyst particles retains catalytic activity and acts to deposit vanadium, nickel and iron of the heavy oil in the outside layer of the catalyst particles. When the demetallization time further lapses, the outside layer of the catalyst particles which is composed of molybdenum, vanadium, nickel, sulfur, iron, carbon precursor and the like expands, so that all the spacings between the demetallizing catalyst particles are buried by the catalytic action of the metals present in the layer. In this instance, the whole space of the demetallizing catalyst bed including the spacings between the catalyst particles is packed with a solid precipitate with the result that the pressure drop of catalyst bed is rapidly increased to thereby disenable operation of the direct desulfurizer.

In the process of hydrodemetallizing heavy oils, the resolution of the problem of the ΔP increase of catalyst layer has been a longtime theme of the art. For example, U.S. Pat. No. 4,510,263 describes a catalyst packed in a reactor, which is a cylindrical extrudate that exhibits a ΔP increase smaller than those of the catalysts of spherical and columnar extrudates, the above cylindrical extrudate having an internal wall provided with a rib or a vane of, for example, cruciform section so as to attain an improvement of mechanical strength and an expansion of active surface.

Japanese Patent Laid-open Publication No. 63(1988)-194732 proposed, as means for resolving the problem of clogging and activity deterioration, regulating the concentration distribution of active metal component in a catalyst support so that, in a cutting plane of the catalyst support, the concentration is maximized between the center and the outer surface of the catalyst support to thereby suppress the reaction at the outer surface of the catalyst and selectively give preference to the reaction at a region between the above center and outer surface with the result that the amount of deposition on the outer surface is reduced.

Further, Japanese Patent Laid-open Publication No. 2(1990)-305891 proposed structuring the surface of catalyst support particles so that the specific surface area is not greater than 1 m$^2$/g and the pore diameter is at least 10 $\mu$m to thereby not only reduce the number of active sites on the outer surface of the catalyst and give preference to the reaction in pores but also, simultaneously, expand the volume for accommodation of deposited substance with the result that expansion of the catalyst volume is suppressed, thereby resolving the problem of clogging.

In the above process for hydrodemetallizing the stock oil (hydrocarbon oil), an economic advantage is realized by conducting a continuous operation for a prolonged period of time. However, the stock oil increasingly tends to become heavier. The inventors have extensively studied the prior art including the inventions described in the above literature and have found that, in the above process of hydrodemetallizing a heavy stock oil, conducting a continuous operation for a prolonged period of time is difficult with the use of any of the conventional catalysts. For example, with the use of the above catalyst described in U.S. Pat. No. 4,510,263, it is feasible to give a relatively large channel to the reaction fluid (hydrocarbon oil) but it is difficult to maintain the channel for a prolonged period of time.

An object of the present invention is to provide a hydrodemetallizing catalyst for a hydrocarbon oil which, in the hydrogenation of a hydrocarbon oil, especially, a heavy oil, prevents deposition of, for example, heavy metals between catalyst particles to thereby prevent clogging of the catalyst bed and maintain the space between catalyst particles so that a differential pressure increase is prevented with the result that the heavy oil can continuously be hydrodemetallized for a prolonged period of time and which further prevents sticking of catalyst particles to thereby facilitate the withdrawal of the catalyst after the termination of the operation. Another object of the present invention is to provide a process of hydrodemetallizing a hydrocarbon oil with the use of this hydrodemetallizing catalyst for a hydrocarbon oil.

SUMMARY OF THE INVENTION

According to the present invention, there is provided a hydrodemetallizing catalyst for a hydrocarbon oil comprising a support and a catalytic component carried on the support, this catalyst having a surface, part of which has a coating layer composed of an inert substance having substantially no demetallizing activity, this coating layer allowing substantially no reaction fluid to permeate therethrough.

The above coating layer preferably has a specific surface area of not greater than 10 m$^2$/g.

The coating layer is a dense layer which allows substantially no reaction fluid to permeate therethrough to thereby avoid a contact between, the reaction fluid and active sites of the catalyst.

The above inert substance composing the coating layer is selected from among, for example, glasses, inert ceramics and metals which are inert in reaction conditions. The glasses are preferably selected from among low-temperature sintered glasses, solder glasses and glazes.

The inert ceramics are selected from among, for example, $\alpha$-alumina, inert silica, cordierite, mullite and quartz.

The metals which are inert in reaction conditions are selected from among, for example, aluminum and stainless steel.

In the present invention, the hydrodemetallizing catalyst for a hydrocarbon oil which has the coating layer can comprise a spherical, columnar or angular support and a catalytic component carried on the support, part of the surface of the catalyst having this coating layer. In particular, it is preferred that 30 to 90% in area of the surface of the catalyst be coated with the coating layer.

The hydrodemetallizing catalyst for a hydrocarbon oil of the present invention may have a reaction flow path through which a reaction fluid flows thereinside, at least part of an outer surface of the catalyst being provided with the coating layer.

The hydrodemetallizing catalyst for a hydrocarbon oil having a reaction flow path through which a reaction fluid flows thereinside is, for example, in the form of a cylinder having a through hole as the reaction flow path or in the form of a honeycomb structure having a plurality of through holes as the reaction flow path.

The above reaction flow path generally has an equivalent diameter of 1 to 10 mm.

In the above cylindrical or honeycomb structured catalyst having the reaction flow path thereinside, the coating layer is provided on an outer surface of a drum portion thereof and/or an outer surface of an end portion thereof.

The hydrodemetallizing catalyst for a hydrocarbon oil of the present invention is suitably used as a catalyst for fixed bed packing.

In the above hydrodemetallizing catalyst for a hydrocarbon oil of the present invention, part of the catalyst surface which, when the catalyst (single particle or block) is viewed in naked-eye visual field, determines the configuration thereof is coated with a dense layer which is composed of a substance substantially inert in demetallization reaction and which allows substantially no reaction fluid to permeate therethrough to thereby avoid a contact between the reaction fluid and active sites of the catalyst, so that a part free from metal or carbon deposition is secured on the catalyst surface and, by virtue of the part of the surface, sticking of catalyst particles is prevented to thereby form reaction fluid flow paths (channels).

According to the present invention, there is provided a process of hydrodemetallizing a hydrocarbon oil, which comprises hydrogenating a hydrocarbon oil in the presence of the above hydrodemetallizing catalyst for a hydrocarbon oil.

In the present invention, it is preferred that the hydrogenation of a hydrocarbon oil be performed in a fixed bed system. Moreover, it is preferred that the above hydrodemetallizing catalyst for a hydrocarbon oil be used in the most upstream initial catalyst layer (most upstream packed catalyst layer) in which a hydrocarbon oil is contacted with a hydrodemetallizing catalyst.

BRIEF DESCRIPTION OF THE DRAWINGS

FIG. 3 is a perspective view of a Raschig ring shaped hydrodemetallizing catalyst for a hydrocarbon oil having its entire drum surface coated with a coating layer;

FIG. 4 is a perspective view of a cylindrical hydrodemetallizing catalyst for a hydrocarbon oil having a plurality of through holes and having its entire drum surface coated with a coating layer;

FIG. 5 is a perspective view of a cylindrical hydrodemetallizing catalyst for a hydrocarbon oil having a plurality of through holes and having part of its drum surface coated with a coating layer;

FIG. 6 is a perspective view of a cylindrical hydrodemetallizing catalyst for a hydrocarbon oil having a plurality of through holes and having its entire drum surface coated with a coating layer;

FIG. 7 is a perspective view of a cylindrical hydrodemetallizing catalyst for a hydrocarbon oil having a plurality of through holes and having part of its drum surface coated with a coating layer;

FIG. 8 is a perspective view of a cylindrical hydrodemetallizing catalyst for a hydrocarbon oil having a plurality of through holes and having part of its drum surface coated with a coating layer;

FIG. 9 is a perspective view of a honeycomb structured hydrodemetallizing catalyst for a hydrocarbon oil having its entire drum surface coated with a coating layer;

DETAILED DESCRIPTION OF THE INVENTION

Figure 1:
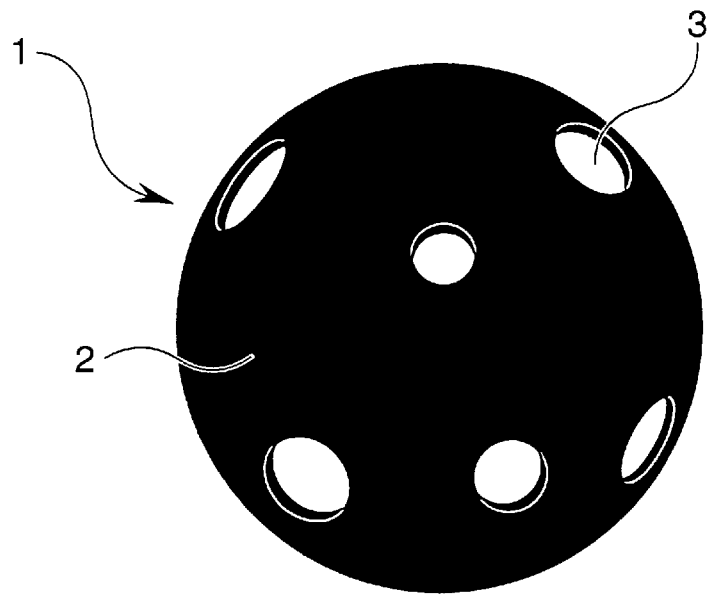
FIG. 1 is a perspective view of one form (spherical catalyst) of hydrodemetallizing catalyst for a hydrocarbon oil according to the present invention.

The hydrodemetallizing catalyst for a hydrocarbon oil of the present invention and the process of hydrodemetallizing a hydrocarbon oil in which the above catalyst is employed will be described in detail below.

Hydrocarbon Oil Hydrodemetallizing Catalyst

The hydrodemetallizing catalyst for a hydrocarbon oil of the present invention comprises a support and a component having catalytic activity (hereinafter referred to as "catalytic component") carried on the support. This catalyst has a surface, part of which has a coating layer composed of an inert substance having substantially no demetallizing activity, this coating layer allowing substantially no reaction fluid to permeate therethrough. A reaction surface (surface contacting with the reaction fluid) is formed on part of the surface of the above hydrodemetallizing catalyst for a hydrocarbon oil.

In the present invention, the above coating layer is a dense layer which allows substantially no reaction fluid to permeate therethrough to thereby avoid a contact between the reaction fluid and active sites of the catalyst.

In the present invention, common supports such as alumina, silica, silica-alumina, titania, magnesia and silica-magnesia can be used without any particular limitation as the support of the hydrodemetallizing catalyst for a hydrocarbon oil.

These supports have a specific surface area (measured by the BET method) of at least 50 $m^2/g$, preferably, 100 to 300 $m^2/g$.

A wide variety of catalytic components known as hydrogenating catalysts in the art can be used as the catalytic component carried on the support. For example, use can be made of oxides and sulfides of metals of the group VIB, such as molybdenum, tungsten and chromium, and metals of the group VIII, such as nickel and cobalt.

Although either a single catalytic component or a plurality of catalytic components in combination may be carried on the support, in the present invention, it is preferred that molybdenum be combined with nickel and/or cobalt and carried on the support.

With respect to the above catalytic component, it is preferred that each metal of the group VIB be carried on the support in an amount of 5 to 30% by weight in terms of oxide and each metal of the group VIII, in an amount of 1 to 10% by weight in terms of oxide.

The above catalytic component can be carried on the catalyst support by the conventional methods. For example, the catalytic component can be carried by the impregnation method in which the support (molded item) is impregnated with an aqueous solution of catalytic component, the blending/extrusion molding method in which an unmolded support material and a catalytic component or an aqueous solution of catalytic component are blended together and extruded to obtain a molding or the coating method in which the support (molded item) is coated with a catalytic component.

The configuration of the above hydrodemetallizing catalyst for a hydrocarbon oil which comprises the support and the catalytic component carried on the support is not limited at all. For example, it may be any of spherical, columnar, pyramidal and miscellaneous forms such as three-blade, four-blade and dumbbell forms. The columnar support may have a section whose configuration is, for example, any of circular, radial, character (such as T, I, C, E or H) and angular (e.g., rectangular, triangular, hexagonal or octagonal) forms.

In the present invention, it is especially preferred that the hydrodemetallizing catalyst for a hydrocarbon oil have such a structure that a single or a plurality of reaction flow paths through which a reaction fluid flows are provided in the catalyst and that a demetallization reaction is induced on the surface of the reaction flow paths.

Although the above reaction flow paths may be undefined holes such as those of a filter as long as the holes communicate with both end faces of the catalyst, the reaction flow paths are preferred to be through holes from the viewpoint of pressure drop and moldability.

These reaction flow paths (flow holes) preferably have an equivalent diameter (sectional area×4/circumferential length of section) of about 1 to 10 mm. When the diameter of the reaction flow paths is within the above range, not only can the hydrocarbon oil as a reaction fluid satisfactorily flow therethrough even if the hydrocarbon oil is in a gas phase or liquid phase but also a contact reaction surface can be secured. Further, a satisfactory strength can be secured for the catalyst. In the above catalyst having reaction flow paths, namely, large voids thereinside, metal deposits, carbonaceous deposits, etc. are accumulated in the voids.

When the equivalent diameter is smaller than 1 mm, the flow rate of the reaction fluid is unfavorably low. On the other hand, when the equivalent diameter is larger than 10 mm, the contact reaction surface of the catalyst per se is unfavorably small.

The catalyst having the above reaction flow paths is in the form of, for example, a cylinder (Raschig ring) having a single through hole, a cylinder having a plurality of through holes or a honeycomb structure having a plurality of through holes.

Of the above various forms, the columnar catalyst having a plurality of through holes is preferred. This catalyst preferably has an opening area ratio of at least about 40%.

The size of the above catalyst is not particularly limited as long as it is moldable and can be used in a reactor.

In the present invention, part of the above catalyst outer surface is provided with a coating layer composed of an inert substance having substantially no demetallizing activity, this coating layer allowing substantially no reaction fluid to permeate therethrough.

This coating layer is a dense layer which allows substantially no reaction fluid (hydrocarbon oil) to permeate therethrough to thereby avoid a contact between the reaction fluid and active sites of the catalyst. This coating layer inhibits the passing of the reaction fluid therethrough to avoid a contact between the reaction fluid and active sites of the catalyst or can inhibit the diffusion of the catalytic component to the outer surface of the catalyst. Thus, the hydrocarbon oil demetallizing reaction and carbonaceous material deposition reaction are inhibited on the catalyst surface provided with the coating layer, so that the spacing between catalyst particles is maintained without accumulation of metals and carbonaceous material between catalyst particles, thereby maintaining the flow of hydrocarbon oil through the catalyst bed.

The expression "coating layer which allows substantially no reaction fluid to permeate therethrough" used herein means the coating layer which does not allow any reaction fluid to permeate therethrough at all and the coating layer which allows an extremely small amount of reaction fluid to permeate therethrough but inhibits deposition of metals and carbonaceous material on the part provided with the coating layer to thereby prevent sticking of catalyst particles.

Specifically, it is preferred that the coating layer have a small specific surface area and have substantially no pores, do not easily hold catalytic component and metals deposited from the reaction fluid (hydrocarbon oil), inhibit the leaching of catalytic component carried inside the catalyst to the surface of the coating layer and be composed of a material which allows substantially none of the hydrocarbon oil to permeate therethrough.

More specifically, the specific surface area of the coating layer is not greater than 10 $m^2/g$, preferably, not greater than 1 $m^2/g$. When the specific surface area of the coating layer is greater than 10 $m^2/g$, the coating layer would have deteriorated properties as to metal unholding properties, catalytic component leaching inhibiting properties and reaction fluid permeation inhibiting properties.

With respect to the material for forming the coating layer, any reaction inert material can be used without any particular limitation as long as the above objects can be attained. For example, use can be made of glasses, inert ceramics and metals which are inert in reaction conditions.

As such glasses, use can be made of glazes; low-temperature sintered glasses such as sodium/boron, lead/boron and silicon/boron glasses; and solder glasses such as zinc/boron and lead/silicon glasses. As such inert ceramics, use can be made of, for example, α-alumina, inert silica, cordierite, mullite and quartz.

As such metals (including alloys) which are inert in reaction conditions, use can be made of, for example, aluminum and stainless steel. At least two members of the above materials can be used in combination. For example, a low-temperature sintered glass and an inert ceramic can be used in combination.

The above coating layer of the present invention is provided on only a part of the catalyst surface, and a reaction surface (noncoated part) is partially formed on the catalyst surface.

In the hydrodemetallizing catalyst for a hydrocarbon oil which has the reaction flow path thereinside as described above, the coating layer is provided on at least part of the outer surface of the catalyst which defines the outer configuration of the catalyst.

Exemplary forms of the hydrodemetallizing catalyst for a hydrocarbon oil of the present invention having the above coating layer are illustrated in appended drawings.

In the below described drawings, the catalytic component is carried on the support of the catalyst. Referring to FIG. 1, the spherical catalyst 1 has such a structure that the coating layer 2 is partially provided on the catalyst surface of the spherical support 3 having the catalytic component carried thereon.

Figure 2:
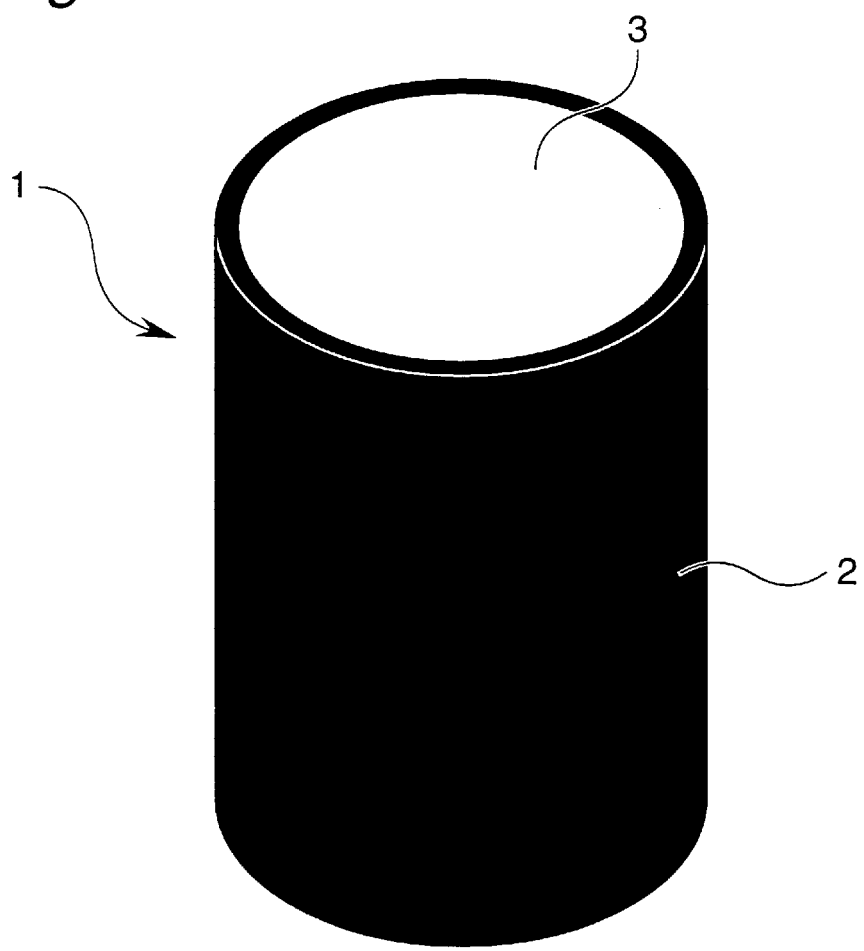
FIG. 2 is a perspective view of another form (columnar) of hydrodemetallizing catalyst for a hydrocarbon oil according to the present invention.

Referring to FIG. 2, the columnar catalyst 1 has such a structure that the coating layer 2 is provided on the peripheral surface of the drum part of the columnar support 3 having the catalytic component carried thereon. The coating layer 2 is not provided on end portions of the columnar catalyst.

The hydrodemetallizing catalyst for a hydrocarbon oil of the present invention preferably has such a structure that the reaction flow path is provided inside the catalyst. Such preferred forms will be illustrated in FIGS. 3 to 9.

Figure 3:
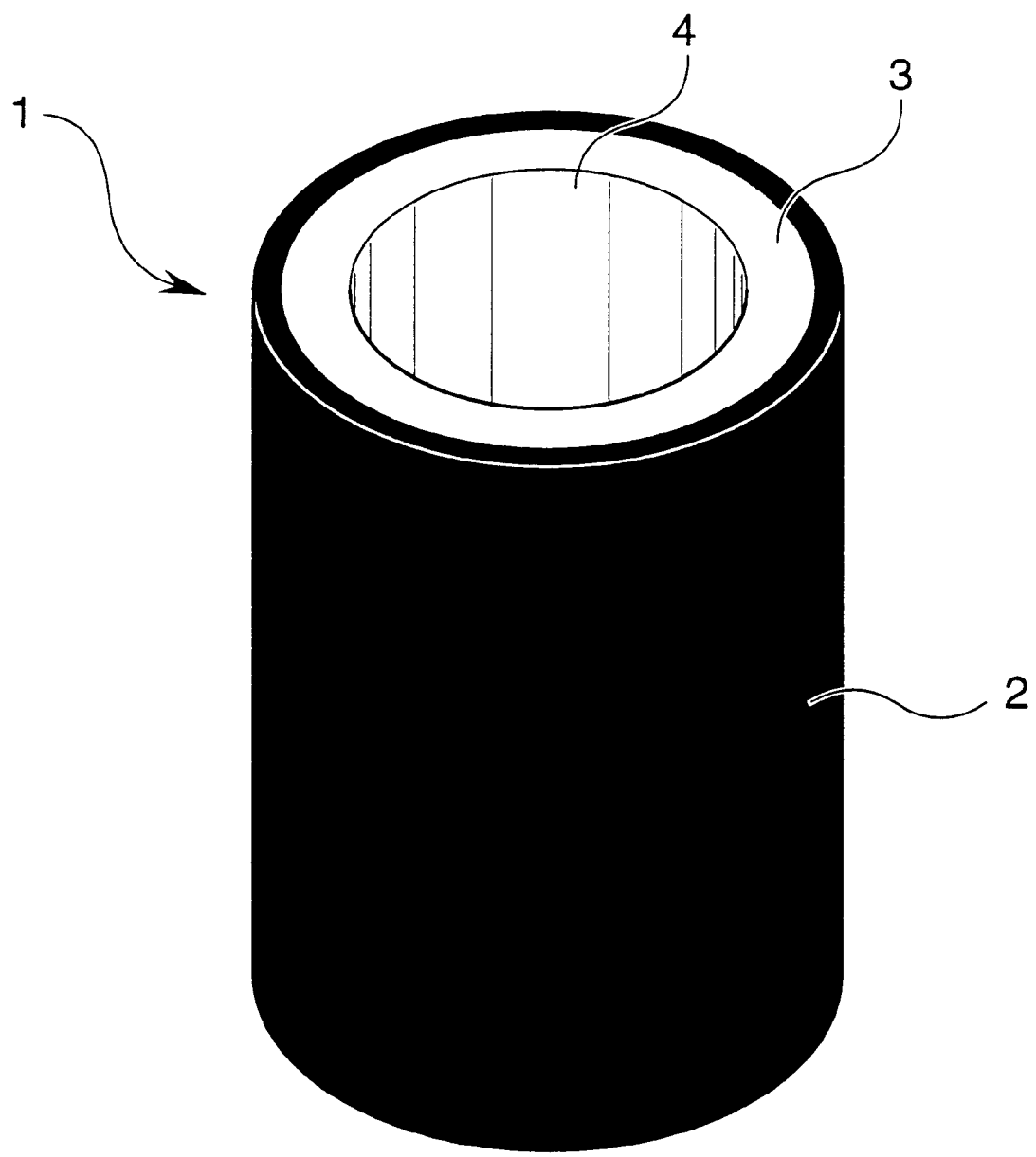
FIGS. 3 to 9 are perspective views of hydrodemetallizing catalysts for a hydrocarbon oil which have reaction flow paths thereinside.

Referring to FIG. 3, the catalyst 1 is in the form of a Raschig ring structure having a single through hole 4, and the coating layer 2 is provided on the peripheral surface of the drum (circular rim) part of the support 3 having the catalytic component carried thereon.

Figure 4:
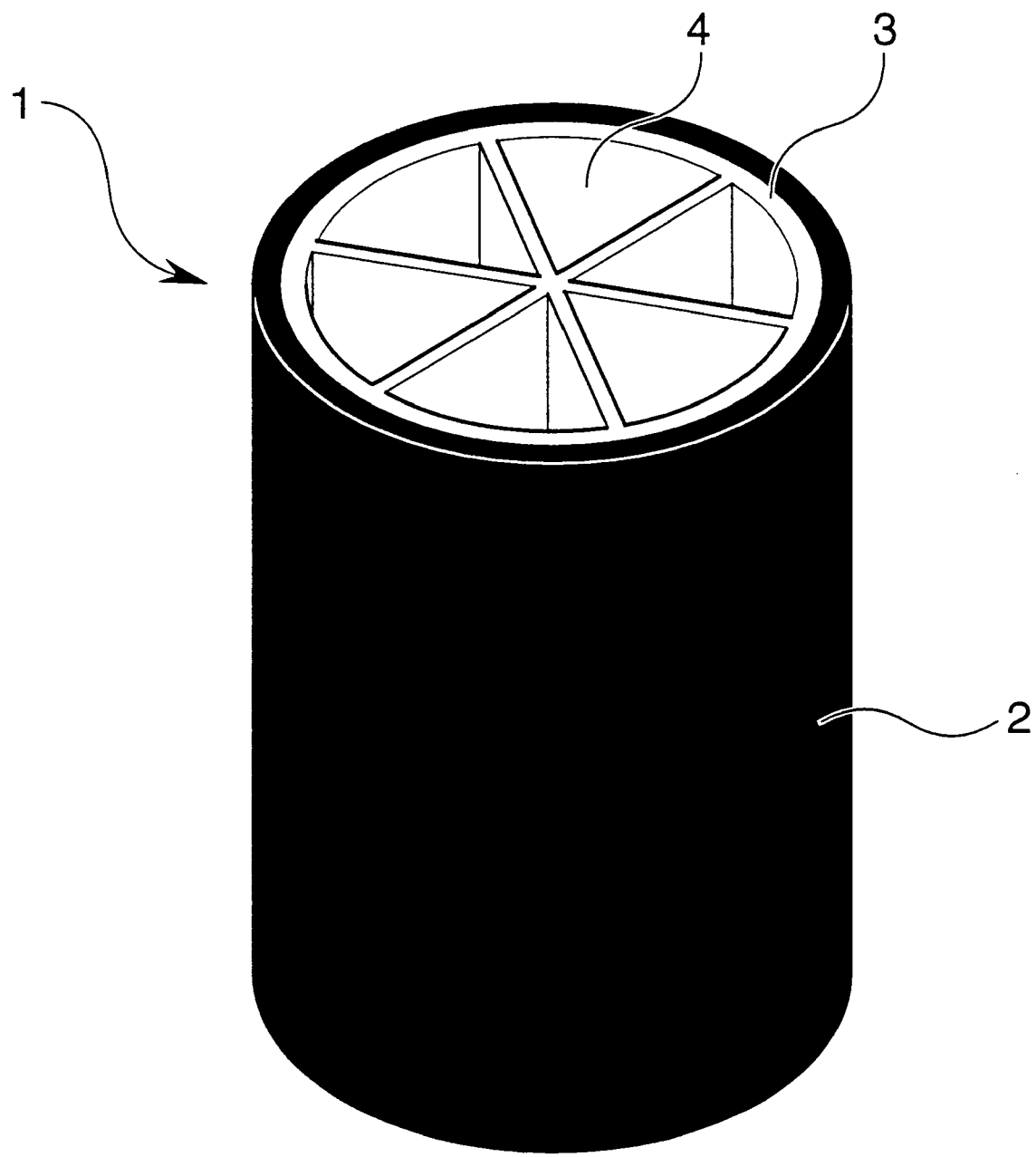

Referring to FIG. 4, the catalyst 1 is in the form of a cylindrical structure having a plurality of through holes 4, and the coating layer 2 is provided on the entire peripheral surface of the drum part of the support 3 having the catalytic component carried thereon.

Figure 5:
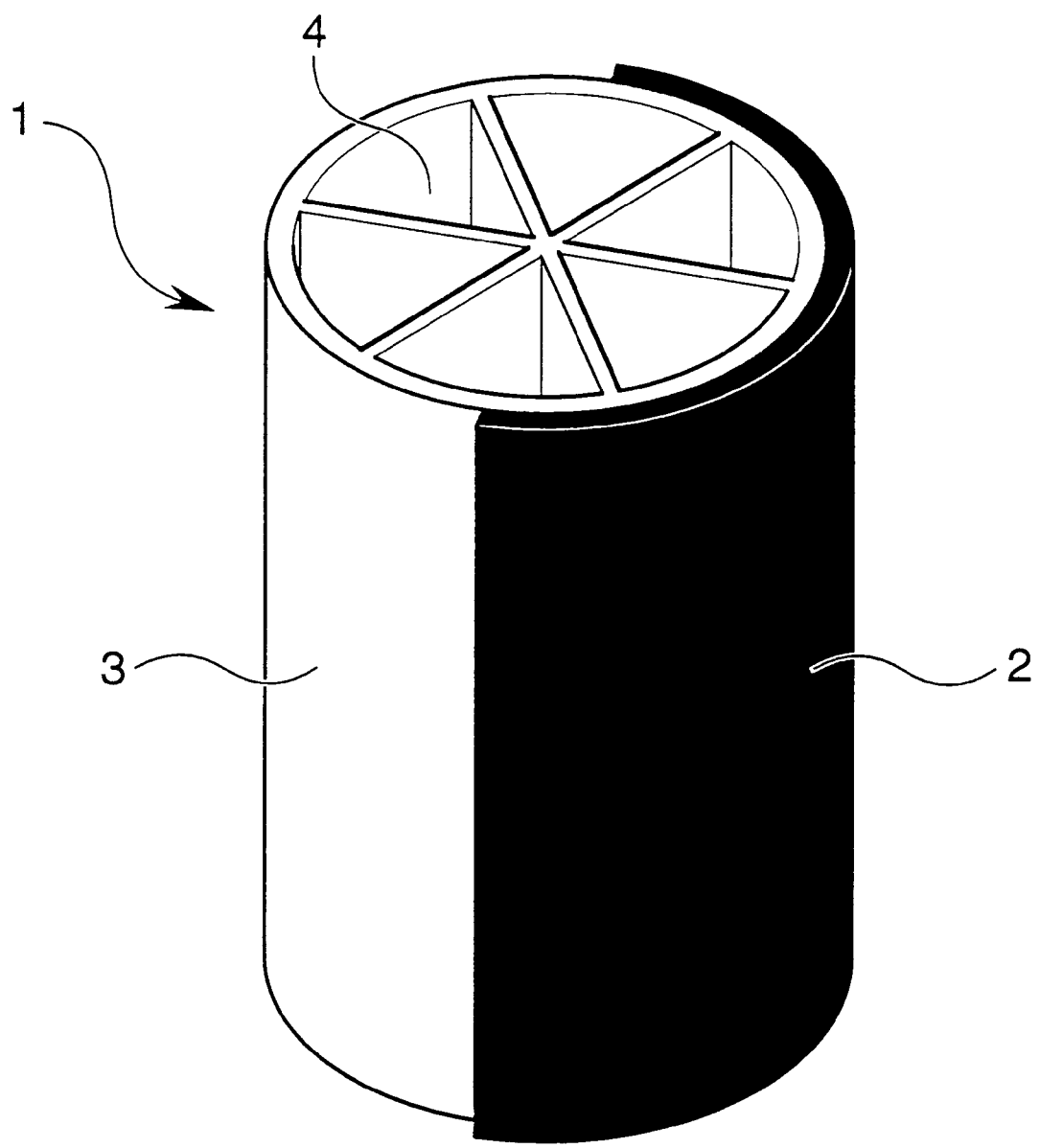

Referring to FIG. 5, the catalyst 1 is in the form of a cylindrical structure having a plurality of through holes 4, and the coating layer 2 is provided on part of the peripheral surface of the drum part of the support 3 having the catalytic component carried thereon.

Figure 6:
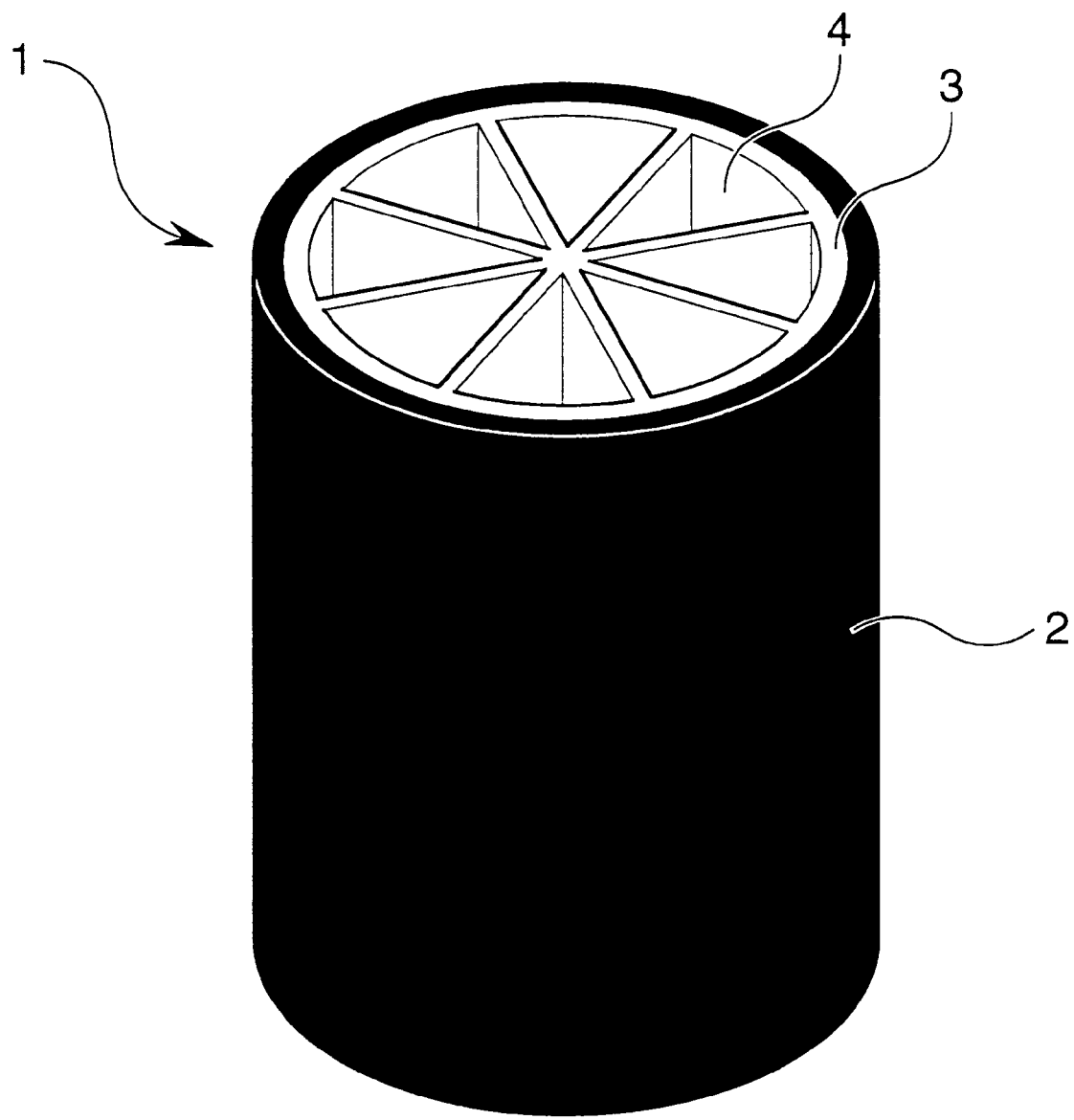

Referring to FIG. 6, the catalyst 1 is in the form of a cylindrical structure having a plurality of through holes 4, and the coating layer 2 is provided on the entire peripheral surface of the drum part of the support 3 having the catalytic component carried thereon.

Figure 7:
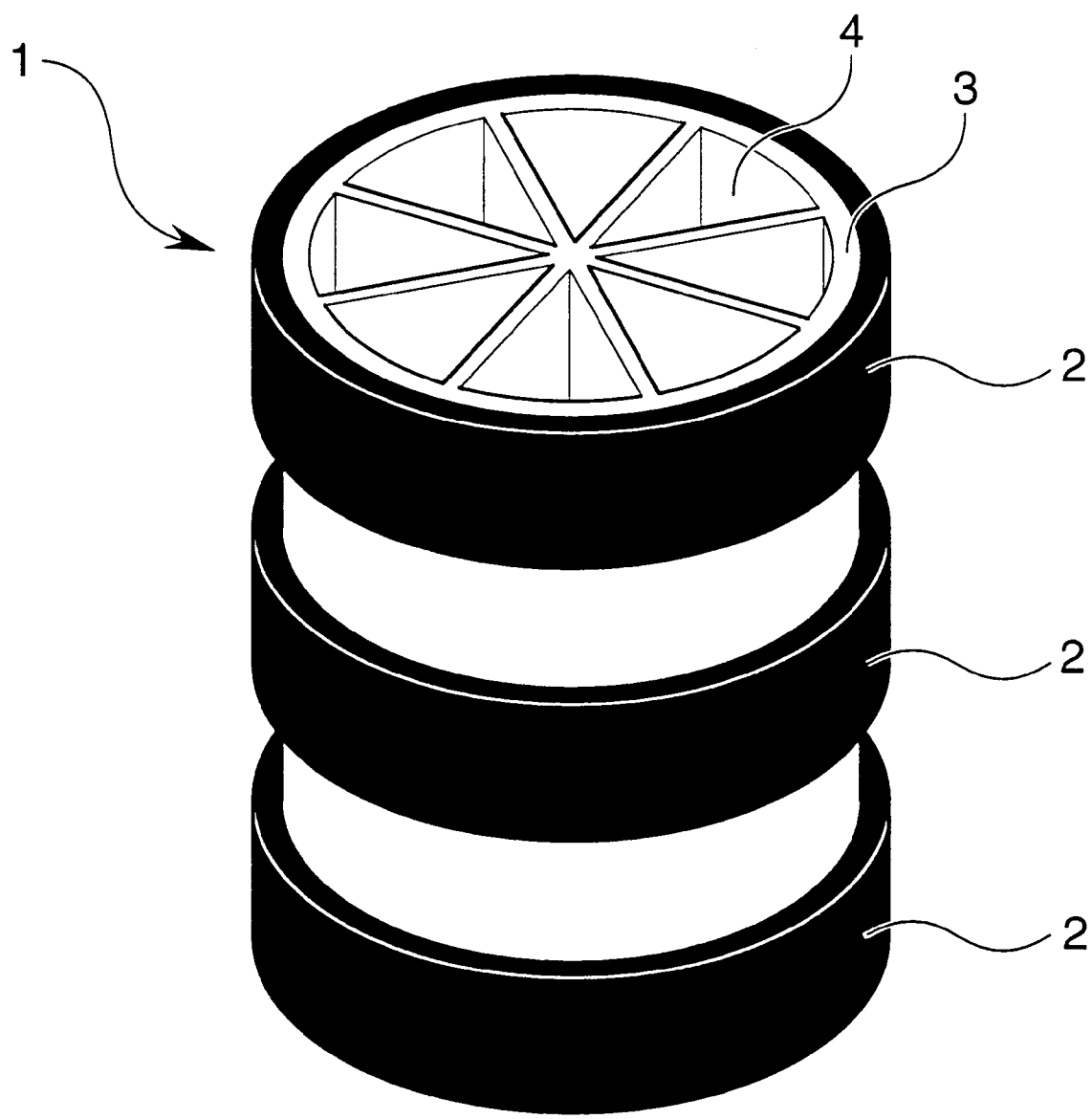

Referring to FIG. 7, the catalyst 1 is in the form of a cylindrical structure having a plurality of through holes 4, and protruding coating layers 2 are provided on part of the peripheral surface of the drum part of the support 3 having the catalytic component carried thereon.

Figure 8:
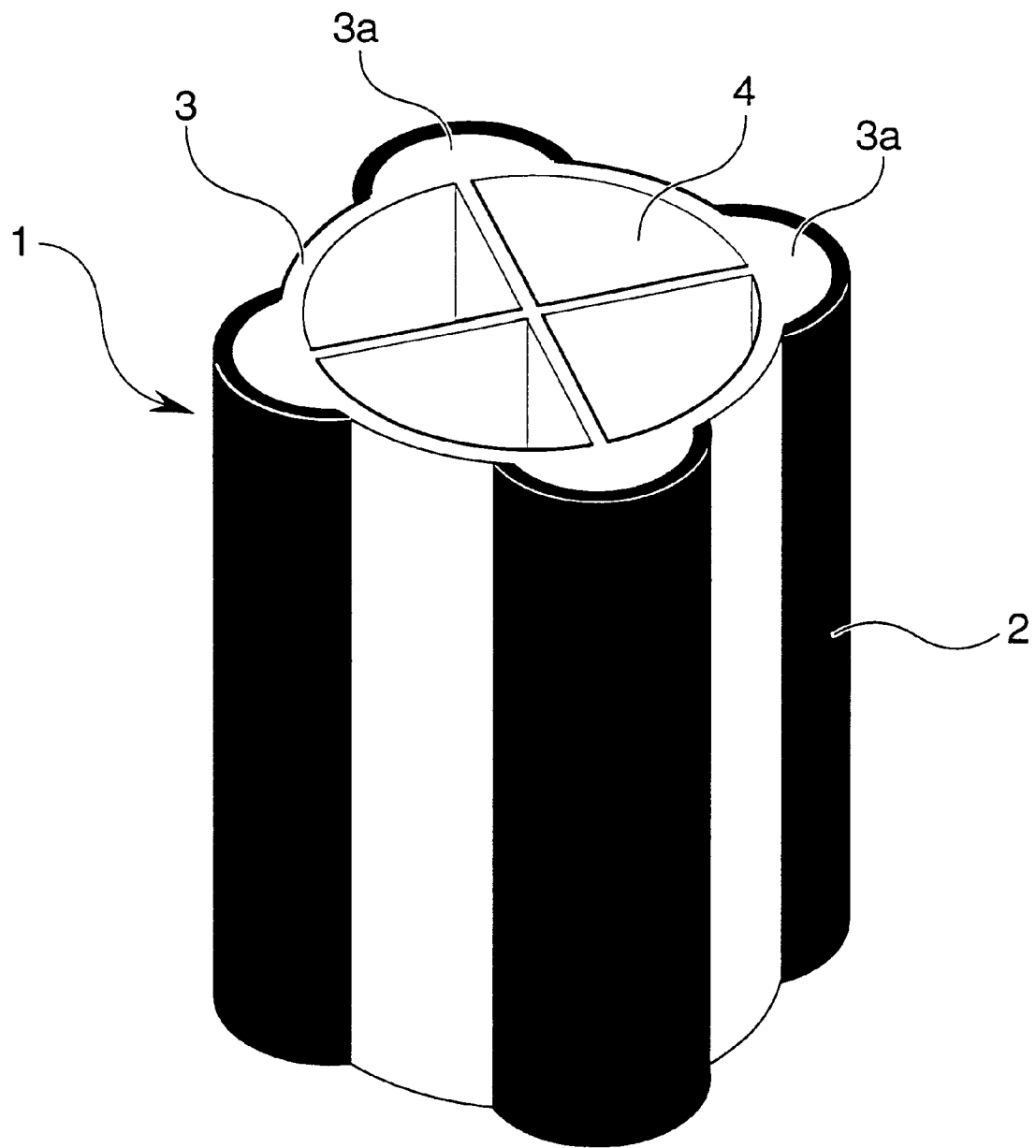

Referring to FIG. 8, the catalyst 1 is in the form of a cylindrical structure having a plurality of through holes 4 and having protrusions 3a on the drum part of the support 3 having the catalytic component carried thereon, and the coating layer 2 is provided on the surface of the protrusions 3a.

Figure 9:
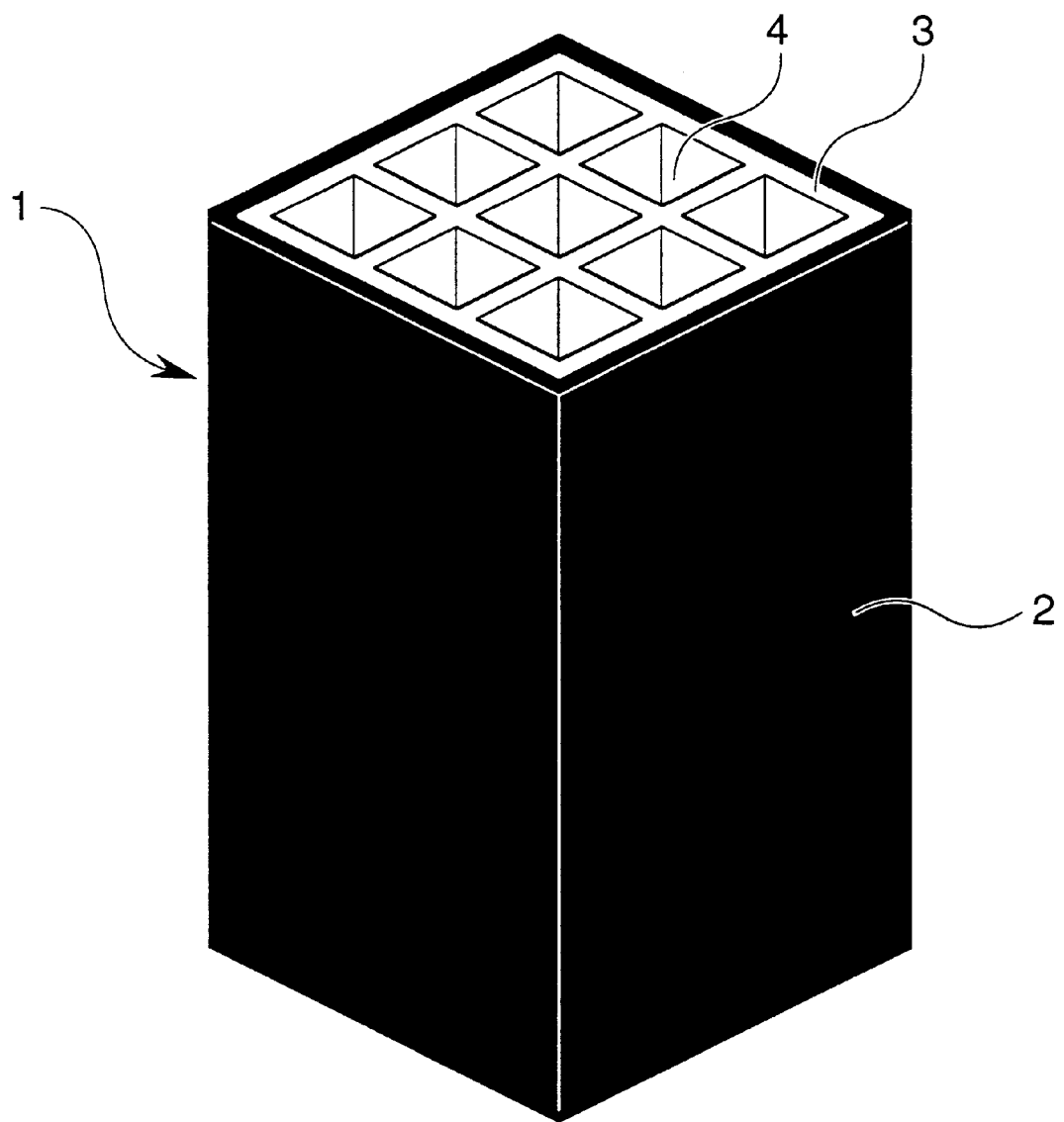

Referring to FIG. 9, the catalyst 1 is in the form of a honeycomb structure having a plurality of through holes 4, and the coating layer 2 is provided on the entire peripheral surface of the drum part of the support 3 having the catalytic component carried thereon.

The columnar catalysts having a plurality of through holes 4 as shown in FIGS. 4 to 9 are preferred of the above various forms of catalysts.

In the present invention, the configurations of the catalyst and the coating part on the catalyst surface are not limited to those of the above Figures at all.

It is satisfactory that the coating layer be formed on part of the catalyst surface so that the hydrocarbon oil reaction on the overall catalyst surface can be inhibited to thereby prevent sticking of catalyst particles (clogging of catalyst bed). In particular, in the catalyst of FIG. 1 and FIG. 2, it is preferred that 30 to 90% of the catalyst surface area be coated with the coating layer.

In the catalyst having the reaction flow path thereinside, at least part of the outer surface of the catalyst is coated and a reaction surface (noncoated part) is exposed on the surface of the reaction flow path.

In the above catalyst having the reaction flow path, the outer surface of the catalyst to be provided with the coating layer, is part of all the catalyst surface area (surface of the reaction flow path and the outer surface of the catalyst), so that at least part of the outer surface of the catalyst excluding the surface of the reaction flow path, occasionally, the entire outer surface of the catalyst may be provided with the coating layer. In particular, 30 to 100%, preferably, 30 to 98% of the outer surface of the catalyst may be coated with the coating layer. For example, when the catalyst is columnar, e.g., in the form of a cylinder or a honey-comb structure, either or both of the peripheral surface of the drum part and the outer surface of the end portion may be provided with the coating layer. Further, the outer surfaces of the drum part and the end portion may be coated either partially or entirely.

When the coating layer is provided at the above coating ratio, the catalyst can exhibit satisfactory reactivity and, by virtue of the presence of the coating layer which prevents a contact of the reaction fluid with active sites of the catalyst, can secure a surface free of deposition of metals and carbonaceous material, by which the space (flow path) permitting the passage of the reaction fluid therethrough can be held between catalyst particles. By virtue of the above satisfactory securing of the reaction flow path, the clogging of the catalyst bed can be prevented and the differential pressure increase of the catalyst bed can be avoided.

When the above coating ratio is lower than 30%, it is difficult to satisfactorily prevent the sticking and clogging of catalyst particles. On the other hand, with respect to the catalyst having no reaction flow path, when the coating ratio exceeds 90%, the volume of packed catalyst becomes large to thereby enlarge the reactor with the result that the cost of plant construction rises. Although the thickness, density and configuration of the coating layer are not particularly limited, the thickness of the coating layer preferably ranges from about 0.1 $\mu$m to 1 mm.

The method of forming the coating layer is not particularly limited as long as the coating layer can be provided on part of the catalyst surface as described above, and the coating layer is formed by the method suitable for the material of the coating layer. For example, the desired coating layer can be formed by first providing the entire surface of the catalyst with a coating layer and subsequently scratching, cutting or crushing the coating layer so that active catalyst surface is partially exposed while allowing the coating layer to remain on part of the catalyst surface. Alternatively, the coating layer can be formed on a desired part of the catalyst surface by either applying a sol or slurry of a glaze or an inert ceramic to the desired part of the catalyst surface by spraying or brushing or immersing, followed by calcining. In the formation of the coating layer by the above immersion, especially, in the formation of the coating layer on a drum part of a columnar catalyst, with its end faces masked, the columnar catalyst is immersed in the sol or slurry, or the drum of the columnar catalyst is contacted with a shallow reservoir or film of the sol or slurry. When use is made of an extrudate, it is cut into desired size in any of these steps.

The above coating layer prepared from a glass or an inert ceramic is calcined at temperature which is not lower than the hydrogenation temperature for hydrocarbon oil. From the viewpoint that the specific area of the reaction surface is held maximal to thereby avoid deactivation of the active catalyst component, it is generally preferred that the calcining be conducted at 450 to 700° C.

When a coating layer of a metal such as aluminum is provided on part of the catalyst surface, use can be made of, for example, the flame coating or fusion bonding technique.

The catalyst components of the present invention can be carried on a support prior to the formation of the coating layer. However, even if the coating layer is formed in advance, catalyst components are hardly carried on the coating layer, so that catalyst components can also be carried on a support provided with the coating layer.

The catalyst having catalyst components carried on a support may be dried or subjected to preliminary calcining prior to the above formation of the coating layer.

The above catalyst should have such a strength that the catalyst would not be disintegrated when packed in a reactor.

Process of Hydrodemetallizing Hydrocarbon Oil

In the process of hydrodemetallizing a hydrocarbon oil according to the present invention, the hydrocarbon oil is subjected to a hydrogenation with the use of the above hydrodemetallizing catalyst for a hydrocarbon oil.

The hydrocarbon oil to be treated in the present invention is, for example, any of crude oils and heavy oils, such as petroleum distillation residue (under atmospheric or reduced pressure), vacuum gas oil, cracked residue oil, deasphalted residue oil, oil obtained by coal liquefaction, tar sand oil, shale oil and natural bitumen.

The hydrogenation of hydrocarbon oil can be carried out in the same manner as in the prior art, except that use is made of the above hydrodemetallizing catalyst for a hydrocarbon oil of the present invention.

The effect of the present invention can fully be exerted when the hydrogenation is carried out in a fixed bed system. Use is made of a reactor which may be of either a single-stage or a multistage.

Although the catalyst may be randomly packed in the hydrogenation apparatus, a large columnar catalyst can be aligned with its end faces confronting the direction of flow of the reaction fluid.

The hydrogenation and demetallization is preferably performed under the following conditions:

temperature: 200 to 550° C.,
pressure: 50 to 300 kg/cm$^2$,
hydrogen circulation rate: 500 to 2000 Nm$^3$/klit. of oil, and
oil feeding rate: LHSV 0.1 to 20 hr$^{-1}$.

The hydrocarbon oil hydrodemetallizing reaction may be performed in the presence of the above hydrodemetallizing catalyst for a hydrocarbon oil alone or in combination with conventional catalysts (catalysts provided with no coating layer).

Figure 10:
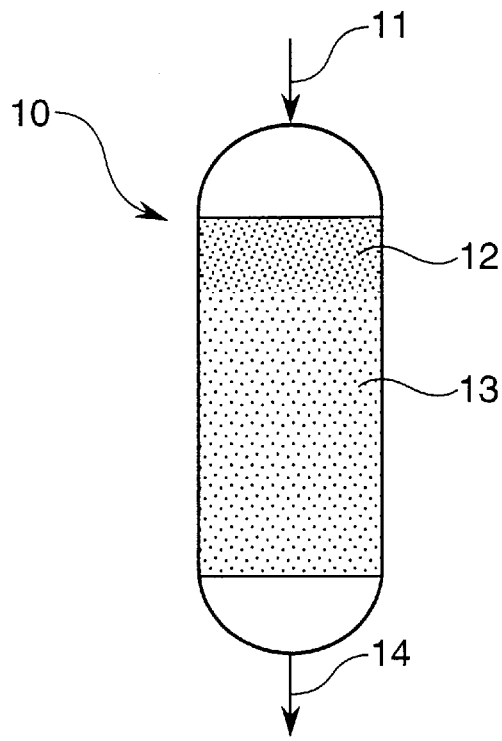
FIG. 10 is a process flow diagram showing one preferred mode of a hydrocarbon oil hydrodemetallizing process according to the present invention.

When the hydrodemetallizing catalyst for a hydrocarbon oil of the present invention is used in combination with conventional catalyst, although a homogeneous mixing state may be realized throughout the reactor, it is preferred that, referring to FIG. 10, the hydrodemetallizing catalyst for a hydrocarbon oil of the present invention be disposed in the layer at which the hydrocarbon oil is initially contacted with the hydrodemetallizing catalyst, i.e., the catalyst layer held the most upstream in contact.

Referring further to FIG. 10, the reaction fluid 11 introduced from the top of the reactor 10 first contacts the hydrodemetallizing catalyst for a hydrocarbon oil 12 of the present invention at the front stage of the reactor and then contacts the conventional catalyst 13 at the rear stage of the reactor to thereby be hydrogenated. The hydrogenation product 14 is withdrawn from the bottom of the reactor 10.

Figure 11:
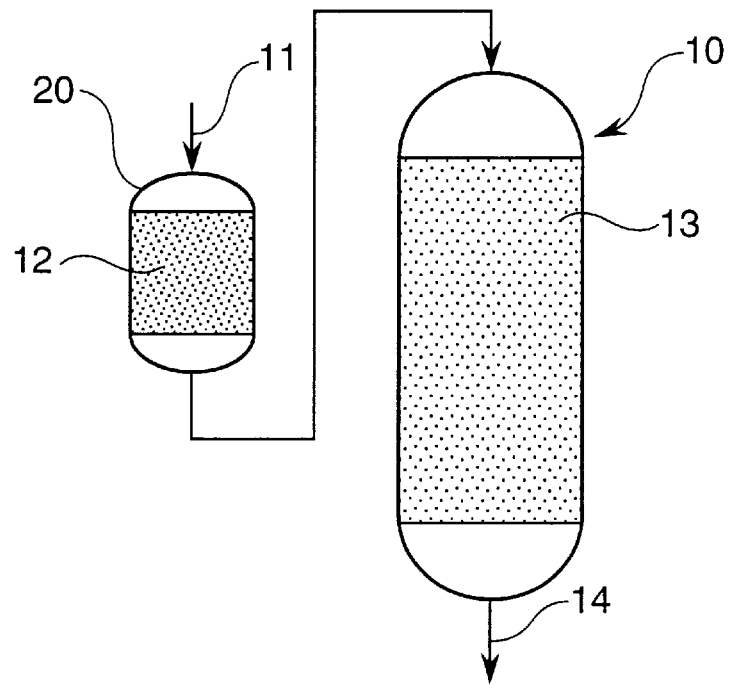
FIG. 11 is a process flow diagram showing another preferred mode of hydrocarbon oil hydrodemetallizing process according to the present invention.

Alternatively, referring to FIG. 11, a reactor 20 in which the hydrodemetallizing catalyst for a hydrocarbon oil 12 of the present invention is packed may be installed upstream of a reactor 10 in which the conventional catalyst 13 is packed. The reaction fluid 11 is first hydrogenated and demetallized in the reactor 20 and then hydrogenated in the reactor 10.

The above use of the hydrodemetallizing catalyst for a hydrocarbon oil of the present invention at the stage in which the reaction fluid initially contacts the hydrogenating catalyst minimizes clogging of the front stage of the catalyst bed to thereby reduce the occurrence of a differential pressure with the result that the catalyst life can be prolonged in the entirety of the apparatus.

The use of the above hydrodemetallizing catalyst for a hydrocarbon oil of the present invention exerts a clogging suppressing effect to thereby avoid a catalyst bed pressure drop increase in the hydrogenation and demetallization of hydrocarbon oils such as heavy oil. Therefore, the drawback of the prior art that the operation must be stopped irrespective of the catalyst placed below the clogged part having satisfactory activity can be obviated. Further, heavy metal impurities contained in heavy oil can be deposited in high concentration throughout the demetallization catalyst bed. In addition, according to the present invention deposition of heavy metal impurities contained in heavy oil on the outer surface of the catalyst can be inhibited and the deposition can be centralized in the internal part of the catalyst, so that the catalyst particles do not stick together in the use of the catalyst to thereby not only facilitate the withdrawal of the catalyst but also shorten the withdrawal time.

Moreover, the present invention is advantageous in that, although in the use of the conventional demetallization catalyst it has been common practice to lower the concentration of active component such as molybdenum to thereby suppress the catalytic activity from the viewpoint of preventing clogging, the flow path of the reaction fluid can be secured by the above method to thereby enable enhancing the concentration of active component carried on a support. Therefore, irrespective of the decrease of the active surface attributed to the coating layer, the present invention ultimately enables satisfactorily holding the desulfurization and denitrification activities and demetallization function per catalyst quantity at levels equal to or higher than in the packing of the conventional catalyst.

The present invention will be further illustrated below with reference to the following Examples, which in no way limit the scope of the invention.

EXAMPLES

Example 1

Preparation of Catalyst

A catalyst was prepared in the following manner.

1. Raw material for support alumina:

Use was made of alumina with pseudoboehmite structure (Versal 250 Alumina produced by LaRoche Industries Inc., LA, USA).

2. Molding (wheel configuration):

Water was added to the above raw material for support alumina, satisfactorily milled and molded by means of an extruder equipped with a die enabling providing a catalyst with the configuration of FIG. 4.

The thus obtained alumina molding was dried in the air at 150° C. and calcined at 600° C. for 1 hr. Thus, there was obtained an alumina support molded into cylindrical wheel configuration.

Dimension of alumina support molded into cylindrical wheel configuration:

| | |
|---|---|
| average outer diameter | 8 mm |
| average length | 9 mm |
| number of ribs | 6 |
| average thickness of circular rim | 1 mm |
| average thickness of rib | 1 mm. |

3. Impregnation of active component:

(3-1) 258 parts by weight of ammonium molybdate (guaranteed reagent produced by Katayama Chemical) was little by little dissolved in 1000 parts by weight of demineralized water. Then, 170 parts by weight of nickel nitrate (guaranteed reagent produced by Katayama Chemical) was little by little dissolved in the obtained solution. According to necessity, aqueous ammonia was added thereto to thereby maintain the pH value of the solution at 10. The obtained solution is hereinafter referred to as an impregnation solution.

(3-2) 330 g of the molded alumina support was immersed in the above impregnation solution and held therein at room temperature for 10 min in vacuum to thereby effect impregnation of the active metal component. Thereafter, the alumina support was quickly taken out from the impregnation solution and dried in 150° C. air, thereby obtaining an alumina support impregnated with the active component.

4. Formation of coating layer:

(4-1) Preparation of slurry for coating layer formation:

100 parts by weight of frit (glaze) composed of lead/silicon glass was added to 100 parts by weight of demineralized water and pulverized and mixed by means of a ball mill. A solution separately prepared by dissolving 3 parts by weight of polyvinyl alcohol (polymerization degree of 1100) in 30 parts by weight of demineralized water was added thereto to thereby obtain a slurry for coating layer formation.

Thus, the frit composition consists of:

| | |
|---|---|
| PbO | 62% by weight, |
| $SiO_2$ | 23% by weight, |
| $B_2O_3$ | 9% by weight, and |
| other | 6% by weight. |

(4-2) The thus obtained slurry was thinly applied by brushing to the entire cylindrical side surface of the dried alumina support obtained in item (3-2) above and dried in the air at 150° C. for 2 hr. Thus, there was obtained an impregnated alumina support having its entire drum surface provided with a coating layer as shown in FIG. 4.

(4-3) The impregnated alumina support provided with coating layer which was prepared in item (4-2) above was calcined at 600° C. for 30 min, thereby obtaining an Ni—Mo—alumina catalyst provided with coating layer.

Thus, the average catalyst composition consists of:

| | |
|---|---|
| $MoO_3$ | 12.9% by weight, |
| NiO | 3.1% by weight, |
| $Al_2O_3$ support | 74.0% by weight, and |
| frit | 10.0% by weight. |

Catalytic Reaction Test

1. Testing apparatus:

Use was made of a testing apparatus of fixed-bed high-pressure circulation type. Hydrogen and feed oil were fed downstream. The catalyst was packed in a random manner. The reaction tube was heated with the use of a sand bath.

2. Reaction conditions:

reaction pressure 150 kg/cm$^2$G,

| | |
|---|---|
| reaction pressure | 150 kg/cm$^2$G, |
| reaction temperature | 410° C., |
| ratio of hydrogen/feed oil | 700 Nlit./lit., and |
| LHSV | 0.5 hr$^{-1}$. |

3. Reaction feed oil:

Use was made of a vacuum distillation residue oil from Middle East oil, characterized by:

| | |
|---|---|
| specific gravity (15° C.) | 1.02, |
| viscosity (100° C.) | 23 cSt, |
| Conradson carbon | 20.0% by weight, |
| asphaltene | 7.6% by weight, |
| Ni + V | 174 wt.ppm, and |
| sulfur | 3.8% by weight. |

Figure 12:
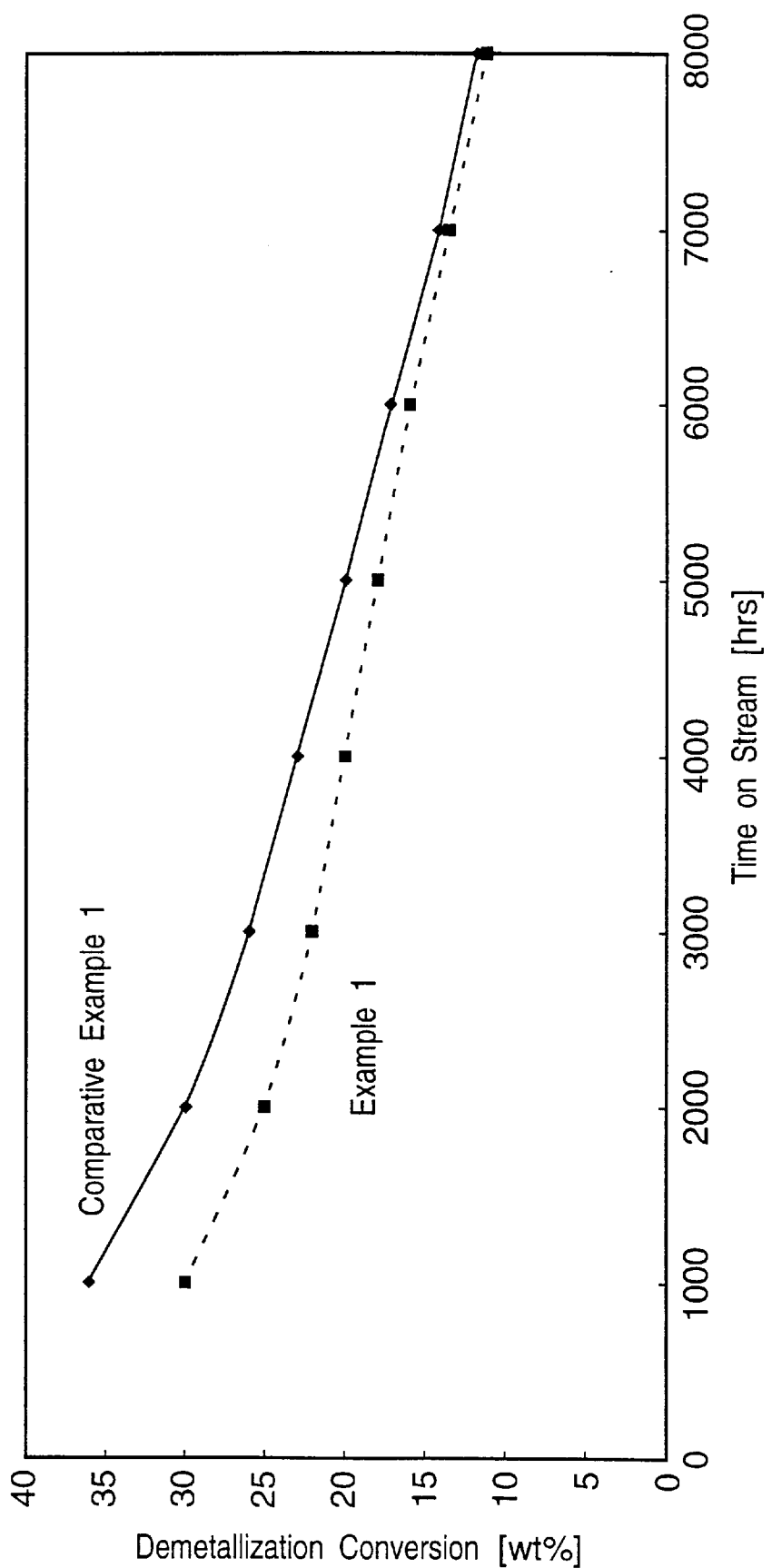
FIG. 12 shows the change of demetallization conversion with the time on stream.
Figure 13:
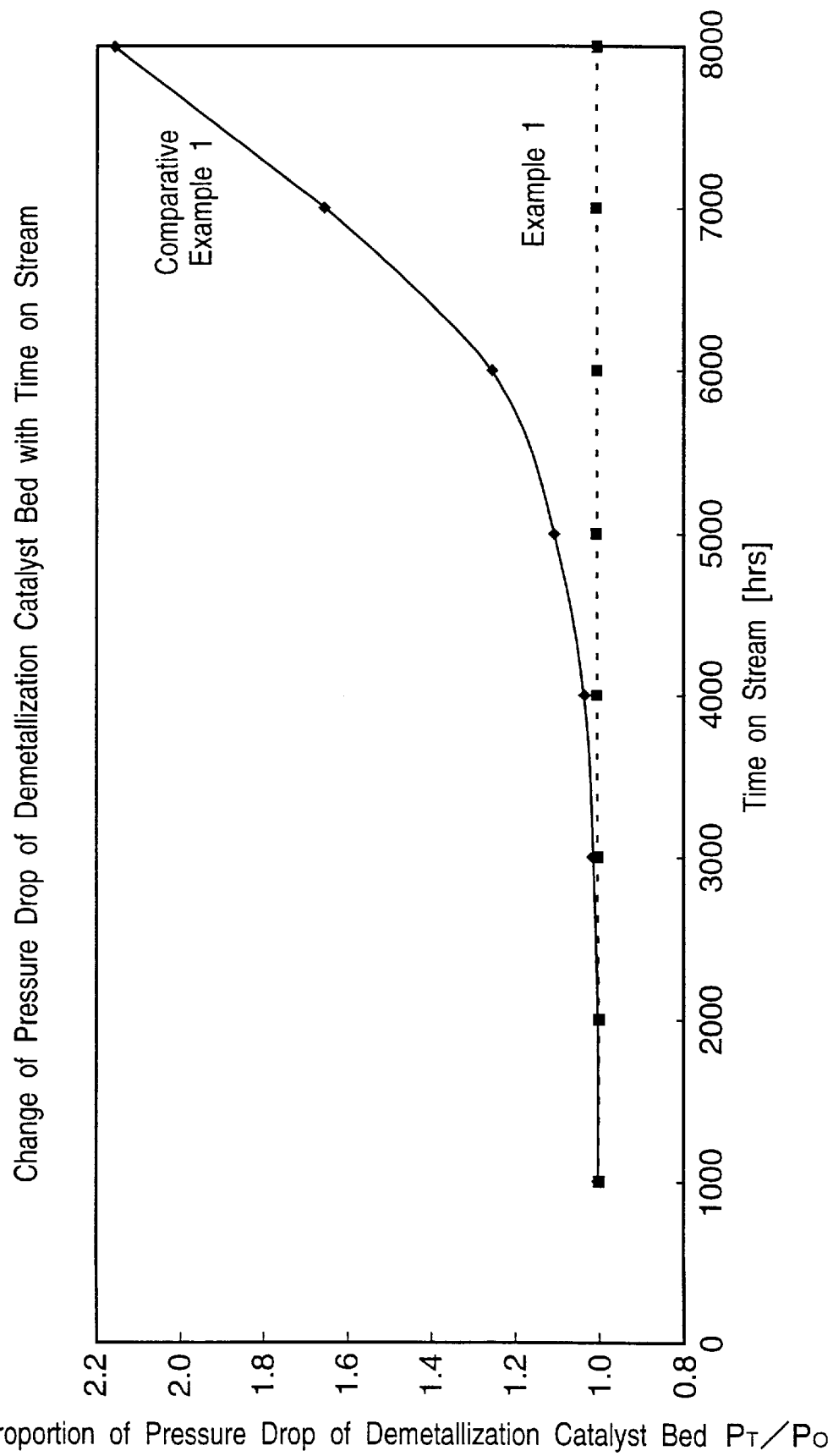
FIG. 13 shows the change of ratio ($P_T/P_O$) of pressure drop of fixed bed catalyst layer with the passage of time.

4. Reaction testing method:

The catalyst packed in a reaction tube was dried at 150° C. in a hydrogen stream. Subsequently, a heavy gas oil containing 1% by weight of dimethyl disulfide was fed together with hydrogen into the reaction tube, and the temperature of the reaction tube was raised to 250° C. at a rate of 15° C./hr to thereby attain presulfurization of the catalyst. Thereafter, the feed oil was switched to vacuum distillation residue oil as a raw material, and the temperature of the reaction tube was raised to 410° C. at a rate of 1° C./hr. This temperature was maintained. The concentration of metal remaining in the vacuum distillation residue oil after the hydrogenation and demetallization thereof was measured by the fluorescent X-ray spectroscopy. Of the reaction test results, the change of demetallization conversion with the time on stream is shown in FIG. 12, and the change of ratio of pressure drop of fixed bed catalyst layer ($P_T/P_O$) with the time on stream is shown in FIG. 13.

$P_T$: pressure drop of catalyst bed T hrs after the initiation of reaction [kg/cm$^2$], and $P_O$: pressure drop of catalyst bed 1000 hrs after the initiation of reaction [kg/cm$^2$].

Comparative Example 1

The dried impregnated alumina support obtained in Example 1 was calcined at 500° C. in the air for 30 min, thereby obtaining an Ni—Mo—alumina catalyst provided with no coating layer.

Thus, the average catalyst composition consists of:

| | |
|---|---|
| $MoO_3$ | 14.3% by weight, |
| NiO | 3.5% by weight, and |
| $Al_2O_3$ | 82.2% by weight. |

Testing was conducted in the same manner as in Example 1, and the results are shown in FIGS. 12 and 13.

Example 2

A catalyst having coating layer was produced in the same manner as in Example 1, except that the coating layer was provided on half the drum surface as shown in FIG. 5 in the catalyst preparation (see item (4-2) above) of Example 1.

The obtained catalyst is as follows.

| | |
|---|---|
| $MoO_3$ | 13.6% by weight, |
| NiO | 3.3% by weight, |
| $Al_2O_3$ support | 78.0% by weight, and |
| frit | 5.1% by weight. |

A catalytic reaction test was conducted in the same manner as in Example 1, except that use was made of the thus obtained catalyst.

Figure 14:
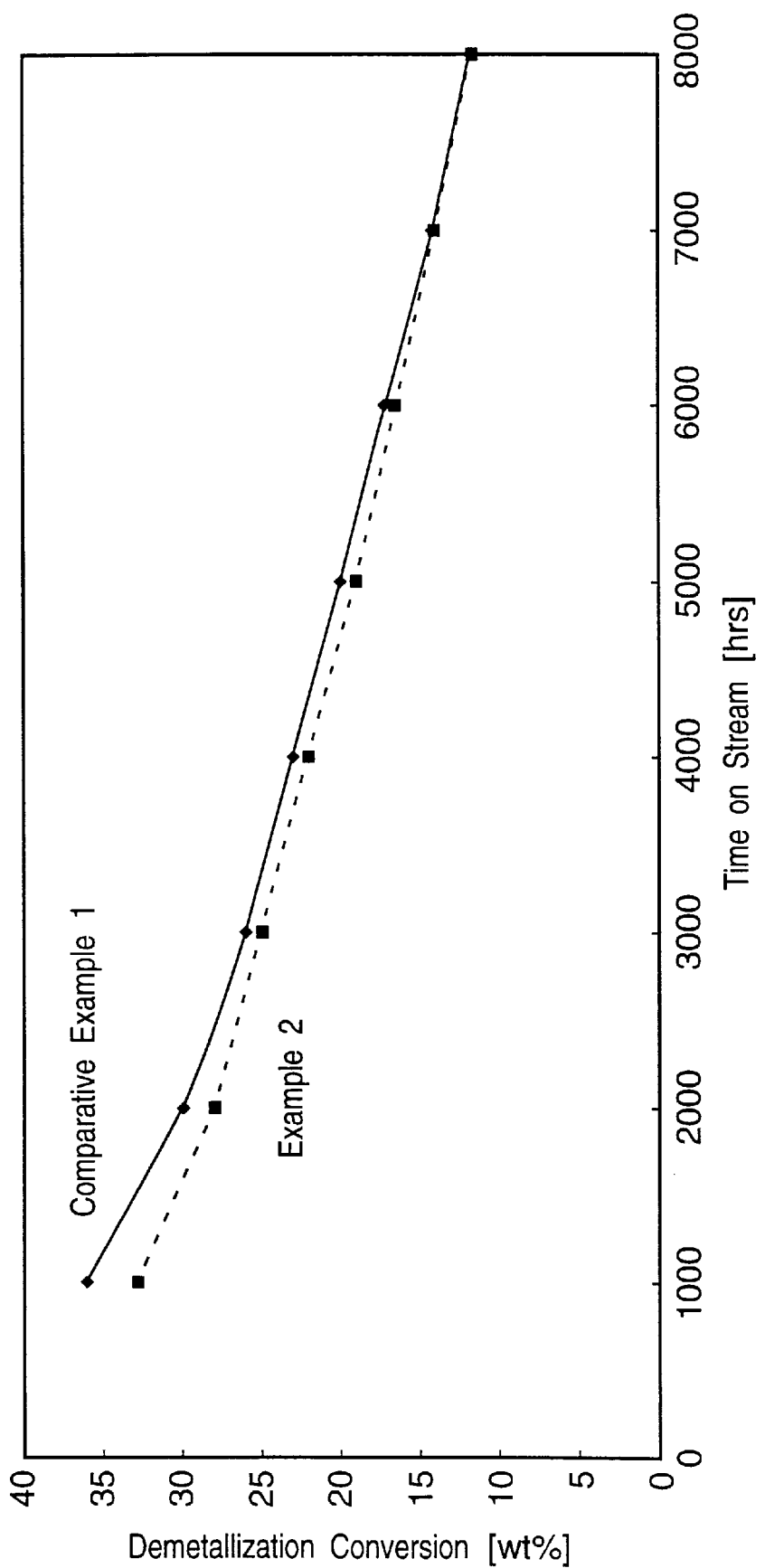
FIG. 14 shows the change of demetallization conversion with the time on stream.
Figure 15:
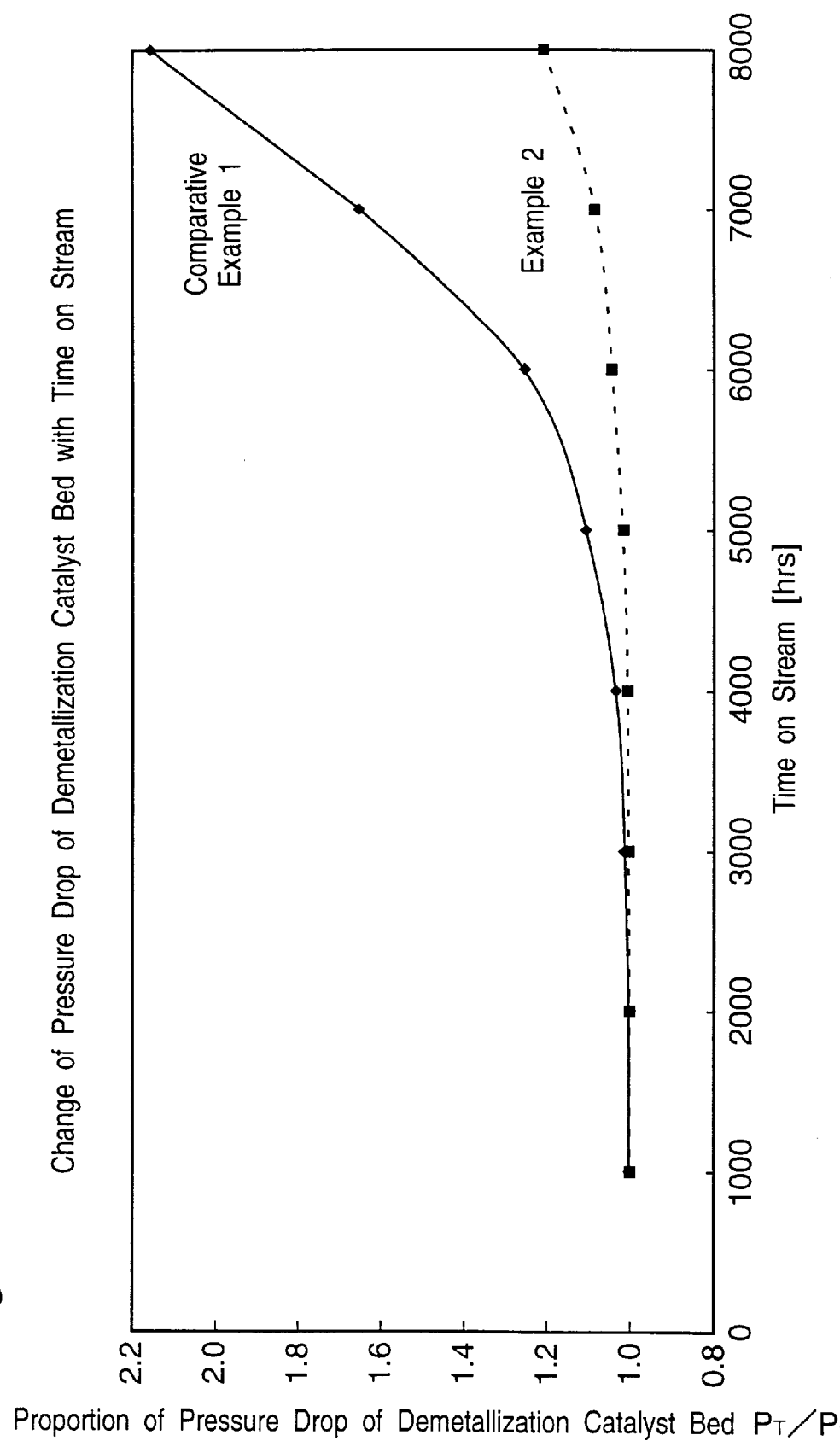
FIG. 15 shows the change of ratio ($P_T/P_O$) of pressure drop of fixed bed catalyst layer with the time on stream.

The change of demetallization conversion with the time on stream is shown in FIG. 14, and the change of ratio of pressure drop of fixed bed catalyst layer ($P_T/P_O$) with the time on stream is shown in FIG. 15. Also, the results of Comparative Example 1 are shown in FIGS. 14 and 15.

Example 3

The catalyst with coating layer obtained in Example 1 (catalyst with wheel configuration, see FIG. 4) and the same catalyst with no coating layer as in Comparative Example 1 (catalyst with wheel configuration) were mixed together and packed in a single test tube. A reaction test for 485 hr was performed under the same conditions as in Example 1.

With respect to the catalyst with coating layer hazing undergone the reaction test, the condition of metal accumulation was analyzed by means of an X-ray microanalyzer. The distribution of accumulated metal concentration is shown in the radial direction (thickness of 1 mm) of the peripheral circular rim of the catalyst with wheel configuration.

Figure 16:
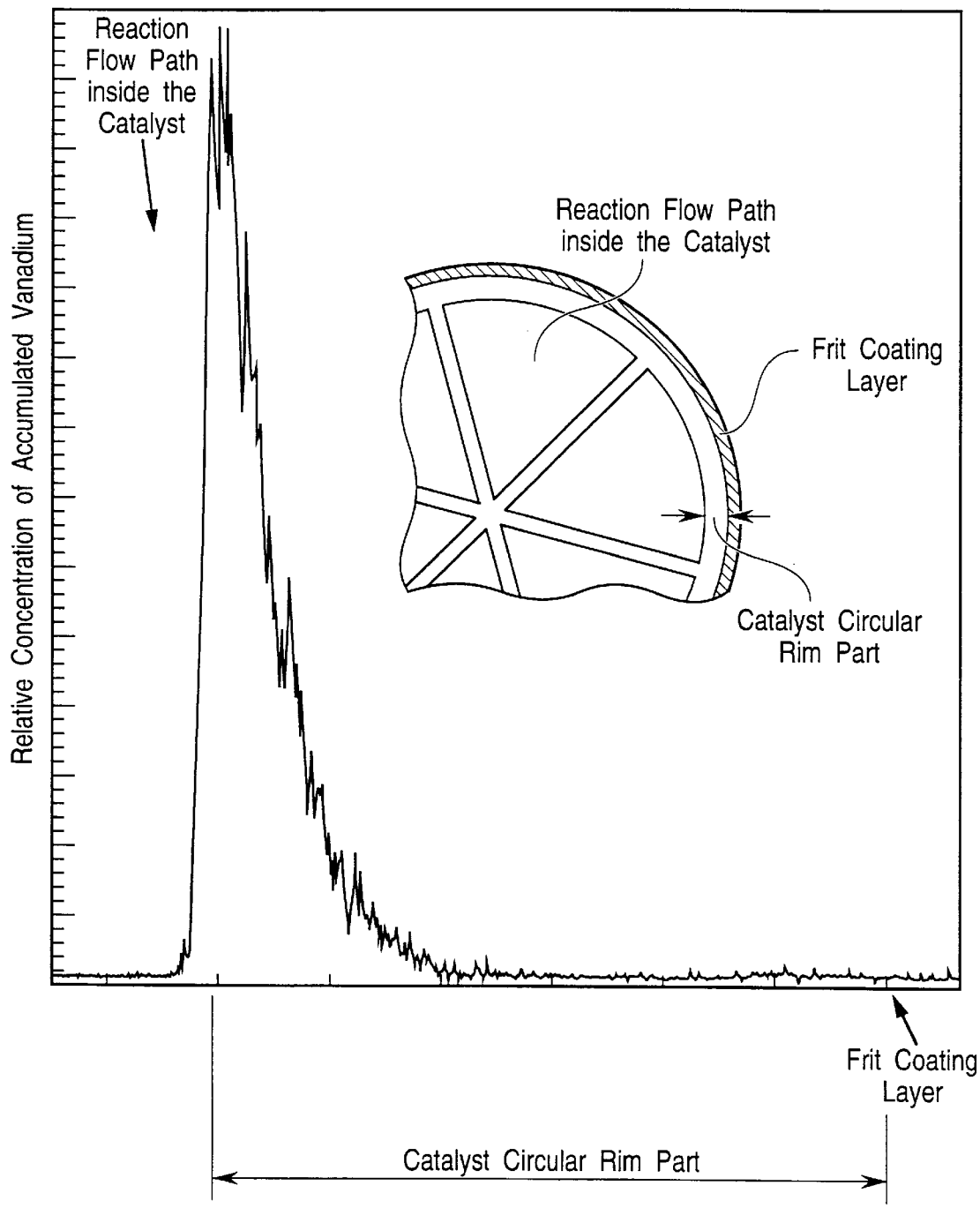
FIG. 16 shows the results of Example 3 (relative concentration of accumulated vanadium)
Figure 18:
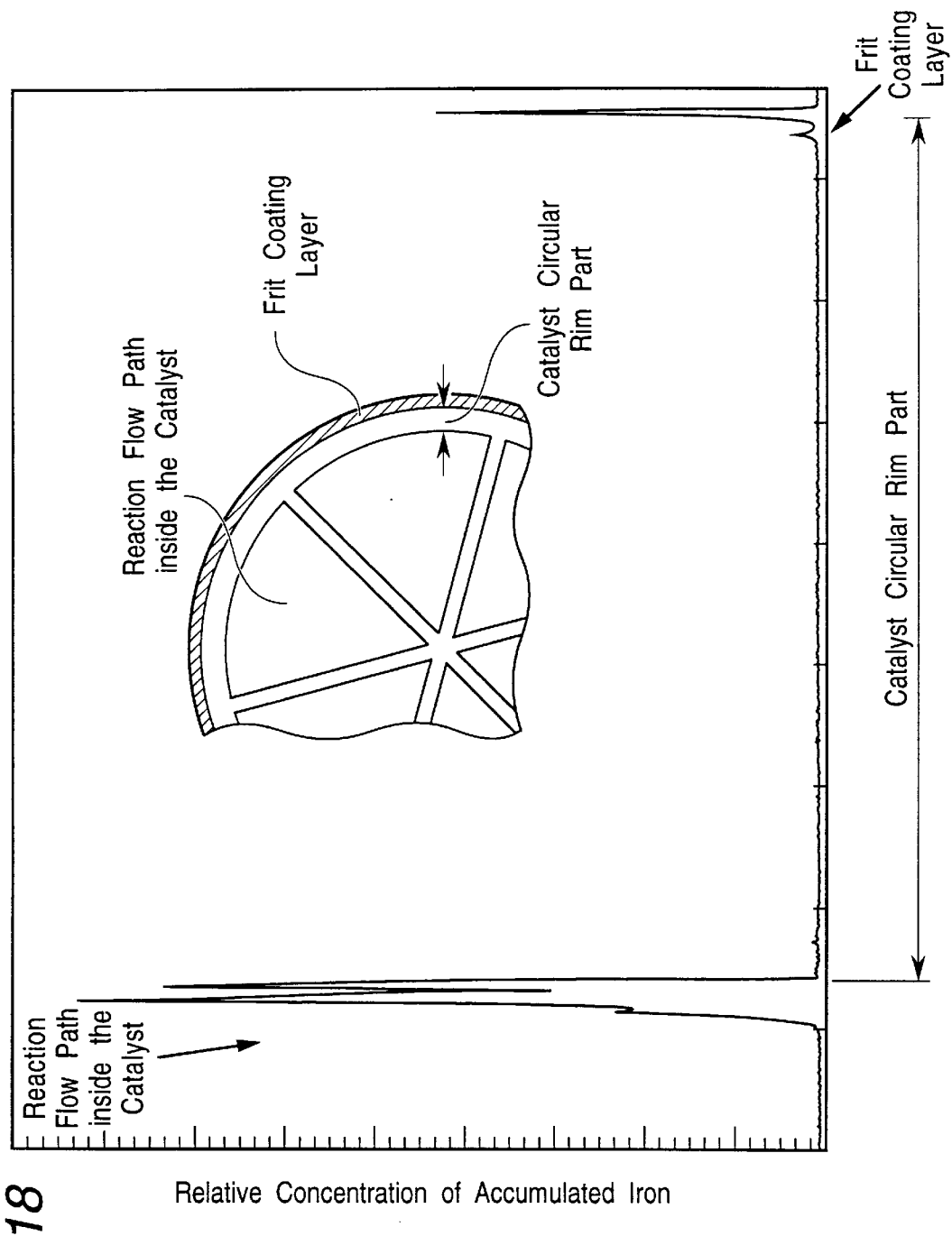
FIG. 18 shows the results of Example 3 (relative concentration of accumulated iron).

The distribution of accumulated vanadium concentration (relative concentration) is shown in FIG. 16 and the distribution of accumulated iron concentration (relative concentration) is shown in FIG. 18.

Comparative Example 2

Figure 17:
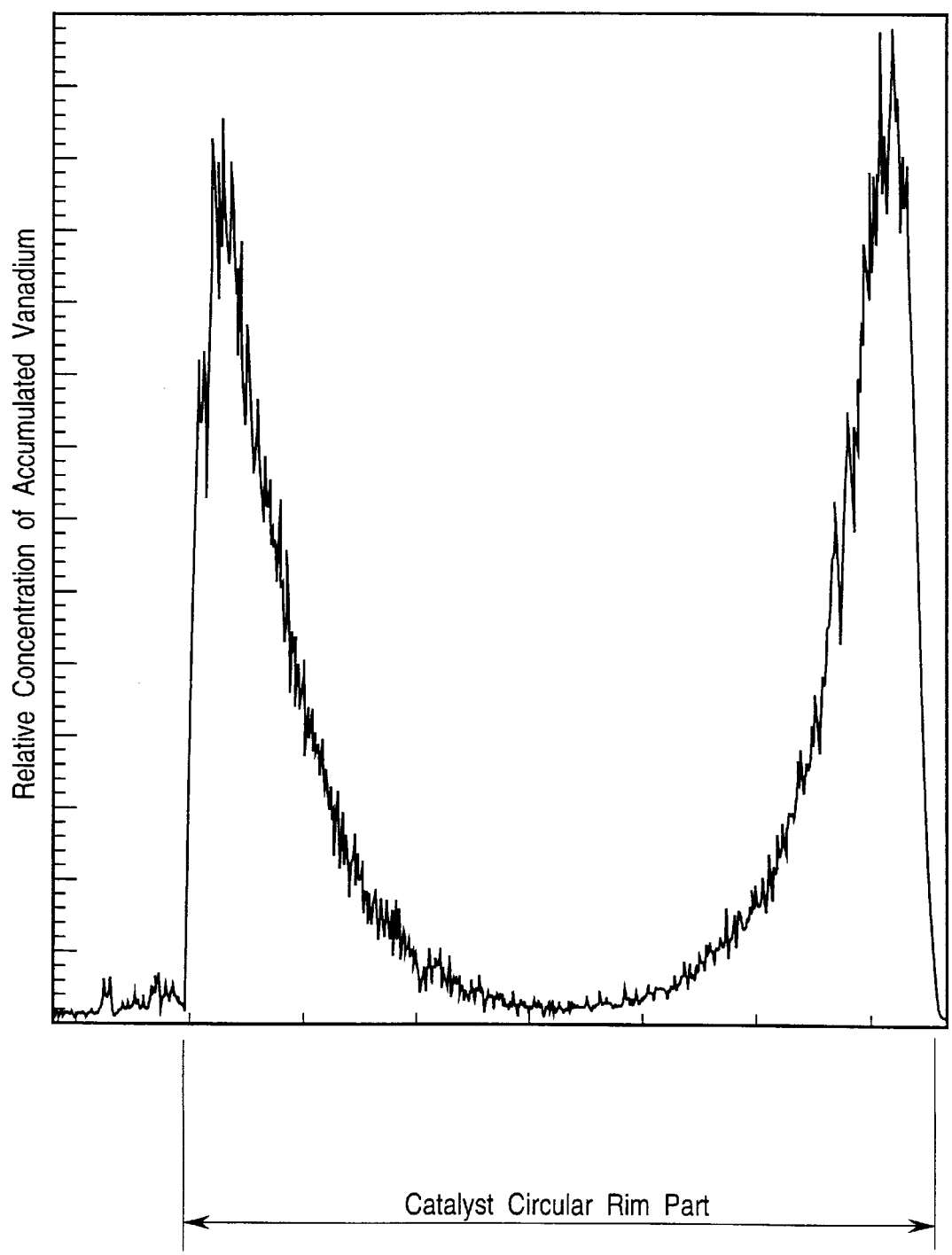
FIG. 17 shows the results of Comparative Example 2 (relative concentration of accumulated vanadium)

With respect to the catalyst with no coating layer having undergone the reaction test as obtained in Example 3, the distribution of accumulated vanadium concentration (relative concentration) measured in the same manner as in Example 3 is shown in FIG. 17.

The following is apparent from the results of Example 3 and Comparative Example 2. With respect to the catalyst (catalyst with coating layer) of Example 3, referring to FIG. 16, the accumulation of vanadium in high concentration was recognized on the inside of the circular rim (on the reaction flow path side) coated with no frit layer but the accumulation of vanadium was not recognized on the frit coated part of the periphery of the circular rim and inside the same, thereby demonstrating the effect of deactivation by the frit. Further, referring to FIG. 18, a layer of a large amount of accumulated iron was formed on the inside of the circular rim coated with no frit layer but the accumulation of iron was slight on the frit coated outer surface of the circular rim, thereby demonstrating the effect of outer surface deactivation by the frit.

In contrast, with respect to the catalyst with no frit coating of Comparative Example 2, the accumulation of vanadium in high concentration was recognized on both the inner and outer surfaces of the circular rim of the catalyst as shown in FIG. 17.

We claim:

1. A hydrodemetallizing catalyst for a hydrocarbon oil, comprising:

a support;

a catalytic component carried on at least part of the support; and a coating layer carried on at least part of at least one of said support and said catalytic component, said coating layer composed of an inert substance having substantially no demetallizing activity, said coating layer allowing substantially no reaction fluid to permeate therethrough, wherein a reaction surface is defined by the noncoated part of the catalytic component.

2. The hydrodemetallizing catalyst for a hydrocarbon oil as claimed in claim 1, wherein the coating layer has a specific surface area of not greater than 10 m²/g.

3. The hydrodemetallizing catalyst for a hydrocarbon oil as claimed in claim 1, wherein the coating layer is a dense layer which allows substantially no reaction fluid to permeate therethrough to thereby avoid a contact between the reaction fluid and active sites of the catalyst.

4. A hydrodemetallizing catalyst for a hydrocarbon oil, comprising:

a support;

a catalytic component carried on at least part of the support; and a coating layer carried on at least part of at least one of said support and said catalytic component, said coating layer composed of an inert substance having substantially no demetallizing activity, said coating layer allowing substantially no reaction fluid to permeate therethrough, wherein a reaction surface is defined by a noncoated part of the catalytic component, and wherein the inert substance composing the coating layer is selected from among glasses, inert ceramics and metals which are inert in reaction conditions.

5. The hydrodemetallizing catalyst for a hydrocarbon oil as claimed in claim 4, wherein the glasses are selected from among low-temperature sintered glasses, solder glasses and glazes.

6. The hydrodemetallizing catalyst for a hydrocarbon oil as claimed in claim 4, wherein the inert ceramics are selected from among α-alumina, inert silica, cordierite, mullite and quartz.

7. The hydrodemetallizing catalyst for a hydrocarbon oil as claimed in claim 4, wherein the metals which are inert in reaction conditions are selected from among aluminum and stainless steel.

8. The hydrodemetallizing catalyst for a hydrocarbon oil as claimed in claim 1, which comprises a spherical, columnar or angular support.

9. The hydrodemetallizing catalyst for a hydrocarbon oil as claimed in claim 8, wherein 30 to 90% in area of a surface of the catalyst is coated with the coating layer.

10. The hydrodemetallizing catalyst for a hydrocarbon oil as claimed in claim 1, wherein the catalyst has a reaction flow path through which a reaction fluid flows thereinside, at least part of an outer surface of the catalyst being provided with the coating layer.

11. The hydrodemetallizing catalyst for a hydrocarbon oil as claimed in claim 1, wherein the catalyst has a reaction flow path through which a reaction fluid flows thereinside, at least part of an outer surface of the catalyst being provided with the coating layer and wherein the catalyst is in the form of a cylinder having a through hole as the reaction flow path.

12. The hydrodemetallizing catalyst for a hydrocarbon oil as claimed in claim 1, wherein the catalyst has a reaction flow path through which a reaction fluid flows thereinside, at least part of an outer surface of the catalyst being provided with the coating layer and wherein the catalyst is in the form of a honeycomb structure having a plurality of through holes as the reaction flow path.

13. The hydrodemetallizing catalyst for a hydrocarbon oil as claimed in claim 10, wherein 30 to 100% of an outer surface of the catalyst is coated with the coating layer.

14. The hydrodemetallizing catalyst for a hydrocarbon oil as claimed in claim 10, wherein the reaction flow path has an equivalent diameter of 1 to 10 mm.

15. The hydrodemetallizing catalyst for a hydrocarbon oil as claimed in claim 10, wherein the coating layer is provided on an outer surface and/or an end portion of a drum portion of a cylinder or a honeycomb structure.

16. The hydrodemetallizing catalyst for a hydrocarbon oil as claimed in claim 1, wherein the catalyst is packed in a fixed bed.

17. A process of hydrodemetallizing a hydrocarbon oil, which comprises hydrogenating a hydrocarbon oil in the presence of a hydrodemetallizing catalyst for a hydrocarbon oil as claimed in claim 1.

18. The process as claimed in claim 17, wherein the hydrogenation is performed in a fixed bed system.

19. The process as claimed in claim 17, wherein the hydrodemetallizing catalyst for a hydrocarbon oil is used in a layer in which an initial contact is effected between a hydrocarbon oil and a hydrodemetallizing catalyst.

20. The hydrodemetallizing catalyst for hydrocarbon oil as claimed in claim 1, wherein said catalytic component includes oxides or sulfides of metals selected from the group consisting of VI B and VIII metals.

21. The hydrodemetallizing catalyst as claimed in claim 1, wherein the coating layer is carried directly on at least a part of the support.

22. The hydrodemetallizing catalyst as claimed in claim 1, wherein the coating layer is carried on at least a part of the catalytic component.

* * * * *

UNITED STATES PATENT AND TRADEMARK OFFICE
CERTIFICATE OF CORRECTION

PATENT NO. : 5,989,412
DATED : November 23, 1999
INVENTOR(S) : Akio Okagami et al.

It is certified that error appears in the above-identified patent and that said Letters Patent is hereby corrected as shown below:

Column 4 Line 9 "between,the" should read --between the--.

Column 13 Line 57 delete "reaction pressure 150 kg/cm²G" (duplicate text).

Column 15 Line 9 "hazing" should read --having--.

Signed and Sealed this

Twelfth Day of December, 2000

Attest:

Attesting Officer

Q. TODD DICKINSON

Director of Patents and Trademarks